United States Patent
Kruger et al.

(10) Patent No.: US 12,502,157 B2
(45) Date of Patent: Dec. 23, 2025

(54) ULTRASOUND SYSTEM HAVING A DISPLAY DEVICE WITH DYNAMIC SCROLL MODE FOR B-MODE AND M-MODE IMAGES

(71) Applicant: FUJIFILM SONOSITE, INC., Bothell, WA (US)

(72) Inventors: Floris Kruger, Bothell, WA (US); Brittney Klingenberg, Snohomish, WA (US); Kristine Kelly, San Diego, CA (US); Craig Chamberlain, Seattle, WA (US); Davin Dhatt, Woodinville, WA (US)

(73) Assignee: FUJIFILM SONOSITE, INC., Bothell, WA (US)

( * ) Notice: Subject to any disclaimer, the term of this patent is extended or adjusted under 35 U.S.C. 154(b) by 152 days.

(21) Appl. No.: 18/344,374

(22) Filed: Jun. 29, 2023

(65) Prior Publication Data
US 2025/0000491 A1  Jan. 2, 2025

(51) Int. Cl.
*A61B 8/00* (2006.01)

(52) U.S. Cl.
CPC .............. *A61B 8/469* (2013.01); *A61B 8/462* (2013.01); *A61B 8/463* (2013.01); *A61B 8/465* (2013.01)

(58) Field of Classification Search
CPC ....... G06F 2203/04803; G06F 3/04886; A61B 8/463; A61B 8/5246; A61B 1/00045; A61B 1/0005; G01S 7/52074
See application file for complete search history.

(56) References Cited

U.S. PATENT DOCUMENTS

| | | | |
|---|---|---|---|
| 2010/0113930 A1* | 5/2010 | Miyachi | A61B 5/7275 600/443 |
| 2015/0186024 A1* | 7/2015 | Hong | G06F 9/542 715/800 |
| 2016/0048635 A1* | 2/2016 | Warner | G16H 30/00 715/704 |
| 2016/0120508 A1* | 5/2016 | Kim | A61B 8/465 600/443 |
| 2019/0038260 A1* | 2/2019 | Lee | A61B 8/582 |
| 2019/0336101 A1* | 11/2019 | Chiang | A61B 1/00 |
| 2021/0019933 A1* | 1/2021 | Westerhoff | G06T 15/08 |
| 2021/0022716 A1* | 1/2021 | Kerby | A61B 8/469 |

(Continued)

OTHER PUBLICATIONS

Vscan AirTM Data Sheet (GE Healthcare, 2020) (Year: 2020).*

(Continued)

*Primary Examiner* — Serkan Akar
*Assistant Examiner* — Jason P Gross
(74) *Attorney, Agent, or Firm* — Womble Bond Dickinson (US) LLP

(57) ABSTRACT

Systems and methods for a dynamic scroll mode are described. In some embodiments, an ultrasound system includes a display device that is configured to simultaneously display an ultrasound image and an additional image. The ultrasound system includes a processor system that is configured to cause the display device to change the simultaneous display so that one of the ultrasound image and the additional image increases in size by an amount and the other of the ultrasound image and the additional image decreases in size by an additional amount that is based on the amount.

17 Claims, 15 Drawing Sheets

(56) References Cited

U.S. PATENT DOCUMENTS

2021/0030399 A1* 2/2021 Tsubota ............... A61B 8/5207

OTHER PUBLICATIONS

Image Segmentation (Wikipedia entry from the Wayback Machine dated Jun. 2, 2022) (Year: 2022).*
Chapter 7—Computer Vision from O'Donnell, Colm P., Colette Fagan, and Patrick J. Cullen, eds. Process analytical technology for the food industry. Springer, 2014. (Year: 2014).*

* cited by examiner

400

Simultaneously display an ultrasound image and
an additional image
402

Cause a display device to change the simultaneous display so that
one of the ultrasound image and the additional image increases in
size by an amount and the other of the ultrasound image and the
additional image decreases in size by an additional amount that is
based on the amount
404

500

Cause a display device to implement a split screen display that includes two display regions that are disjoint, the split screen display including a handle location
502

Receive a user input to move the handle location
504

Adjust, responsive to the user input, sizes of the display regions while keeping the display regions disjoint
506

Cause a display device to implement, during an ultrasound examination, a split screen display that includes two or more display regions, one of the display regions implemented to display a B-mode ultrasound image and another of the display regions implemented to display an M-mode ultrasound image
602

Adjust, during the ultrasound examination, sizes of the display regions and image content of at least one of the B-mode ultrasound image and the M-mode ultrasound image
604

FIG. 6

ULTRASOUND SYSTEM HAVING A DISPLAY DEVICE WITH DYNAMIC SCROLL MODE FOR B-MODE AND M-MODE IMAGES

Embodiments disclosed herein relate to ultrasound systems. More specifically, embodiments disclosed herein relate to ultrasound systems to provide dynamic scrolling.

BACKGROUND

Ultrasound systems can generate ultrasound images by transmitting sound waves at frequencies above the audible spectrum into a body, receiving echo signals caused by the sound waves reflecting from internal body parts, and converting the echo signals into electrical signals for image generation. The ultrasound systems can generate different types of ultrasound images from the echo signals, such as B-mode images (also known as brightness mode) in which an image depicts a scanned plane through a body, and M-mode images (also known as motion mode) in which an image depicts tissue movement over time. To display the ultrasound images, the ultrasound systems can include a display device, such as a clinical display of an ultrasound machine or a portable device (e.g., a tablet or smartphone) connected to the ultrasound machine.

In some cases, the ultrasound systems are implemented to simultaneously display two ultrasound images, such as a B-mode image and an M-mode image in a split screen format of the display device. However, the ultrasound systems usually force the operator to choose from a few predetermined options for screen layout of the ultrasound images. Examples of predetermined options include a [½, ½] split, in which the two ultrasound images occupy different parts of the display that have equal size, and a [⅓, ⅔] split, in which one of the ultrasound images occupies a part of the display that is twice the size of a part of the display occupied by the other ultrasound image.

To select one of the predetermined options for screen layout, the ultrasound systems can require the operator to enter their selection prior to scanning (e.g., prior to the ultrasound examination). In this case, the ultrasound operator may be stuck with their choice of screen layout during the ultrasound examination. Hence, the ultrasound system may not provide the best view available for a particular anatomy being imaged, and the ultrasound operator may incorrectly assess the patient.

In another case, the ultrasound system can provide a menu of the predetermined options for screen layout, such as via a popout window that can be accessed during the ultrasound examination to change the split screen format during the ultrasound examination. However, in this case, the operator is forced to shift their focus away from the clinical information to the menu options (e.g., the popout window) and then back to the clinical information during the scan session. Hence, the operator necessarily is distracted away from the ultrasound images being displayed, and the ultrasound examination can take extra time.

Accordingly, conventional ultrasound systems may not simultaneously display ultrasound images in ways that are beneficial to the patient and/or the operator of the ultrasound system.

SUMMARY

Systems and methods for a dynamic scroll mode are described. In some embodiments, an ultrasound system includes a display device that is configured to simultaneously display an ultrasound image and an additional image. The ultrasound system includes a processor system that is configured to cause the display device to change the simultaneous display so that one of the ultrasound image and the additional image increases in size by an amount and the other of the ultrasound image and the additional image decreases in size by an additional amount that is based on the amount. In some embodiments, the ultrasound system includes a memory implemented to store the ultrasound image and the additional image during an ultrasound examination. In some embodiments, the processor system is configured to, subsequent to the ultrasound examination, transfer the ultrasound image and the additional image to the display device for the simultaneous display and the change to the simultaneous display.

In some embodiments, an ultrasound system includes a display device and a processing system coupled to the display device. In some embodiments, the ultrasound system includes at least one computer-readable medium storing instructions executable via the processing system to implement an ultrasound application. In some embodiments, the ultrasound application is configured to cause the display device to implement a split screen display that includes two display regions that are disjoint. In some embodiments, the split screen display includes a handle location. In some embodiments, the ultrasound application is configured to receive a user input to move the handle location. In some embodiments, the ultrasound application is configured to adjust, responsive to the user input, sizes of the display regions while keeping the display regions disjoint.

In some embodiments, an ultrasound system includes a display device and a processing system coupled to the display device. In some embodiments, the ultrasound system includes at least one computer-readable medium that stores instructions executable via the processing system to implement an ultrasound application. In some embodiments, the ultrasound application is configured to cause the display device to implement, during an ultrasound examination, a split screen display that includes two or more display regions. In some embodiments, one of the display regions is implemented to display a B-mode ultrasound image and one or more another of the display regions are implemented to display an M-mode ultrasound image and/or a Doppler mode ultrasound image (e.g., Tissue Doppler imaging (TDI), a continuous wave (CW) Doppler imaging, a pulse wave (PW) Doppler imaging, High Pulse Repeat Frequency (HPRF) Doppler imaging). In some embodiments, the ultrasound application is configured to adjust, during the ultrasound examination, sizes of the display regions and image content of at least one of the B-mode ultrasound image, the M-mode ultrasound image and the Doppler mode ultrasound image. In some embodiments, a method implemented by the processor system includes simultaneously displaying an ultrasound image and an additional image on a display device. The method also includes causing the display device to change the simultaneous display so that one of the ultrasound image and the additional image increases in size by an amount and the other of the ultrasound image and the additional image decreases in size by an additional amount that is based on the amount.

In some embodiments, a method implemented by the processor system includes causing the display device to implement a split screen display that includes two display regions that are disjoint, the split screen display including a handle location. The method also includes receiving a user input to move the handle location. The method also includes adjusting, responsive to the user input, sizes of the display regions while keeping the display regions disjoint.

In some embodiments, a method implemented by the processor system includes causing the display device to implement, during an ultrasound examination, a split screen display that includes two or more display regions. In some embodiments, one of the display regions is implemented to display a B-mode ultrasound image and another of the display regions is implemented to display an M-mode ultrasound image. The method also includes adjusting, during the ultrasound examination, sizes of the display regions and image content of at least one of the B-mode ultrasound image and the M-mode ultrasound image.

Other systems, devices, and methods to provide a dynamic scroll mode are also described.

BRIEF DESCRIPTION OF THE DRAWINGS

The appended drawings illustrate examples and are, therefore, exemplary embodiments and not considered to be limiting in scope.

FIG. 5 illustrates a method performed by an ultrasound system in accordance with some embodiments.

FIG. 6 illustrates a method performed by an ultrasound system in accordance with some embodiments.

DETAILED DESCRIPTION

In the following description, numerous details are set forth to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Conventional ultrasound systems may not simultaneously display ultrasound images in ways that are beneficial to the patient and/or the operator of the ultrasound system. For example, conventional ultrasound systems usually force the operator to choose from a few predetermined options for screen layout of the ultrasound images, such as a [½, ½] split or a [⅓, ⅔] split. To select one of the predetermined options for screen layout, the ultrasound systems can require the operator to enter their selection prior to scanning, or can provide a menu of the predetermined options, such as a popout window, that can be accessed during the ultrasound examination to change the split screen format.

Figure 1:
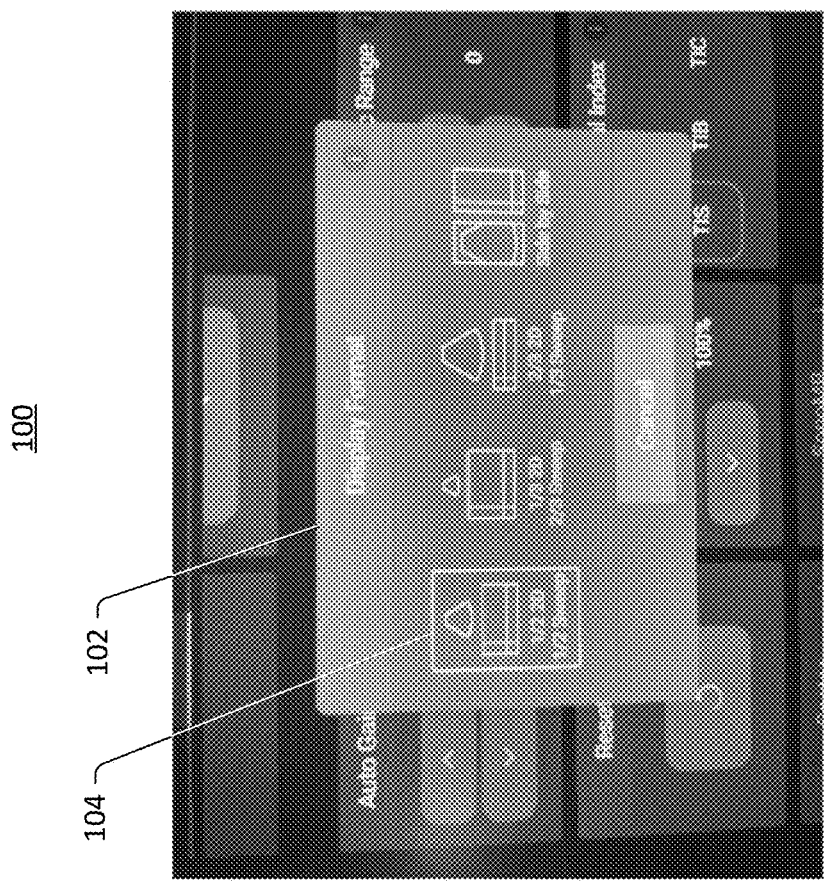
FIG. 1 is a view illustrating menu options for display format in a popout window of a user interface according to some embodiments.

FIG. 1 is a view 100 illustrating menu options for display format in a popout window of a user interface according to some embodiments. As shown in FIG. 1, a menu option 102 includes four predetermined options for a split screen format between a 2D image (e.g., a B-mode image) and a sweep image (e.g., an M-mode image), including a [½, ½] split, a [⅓, ⅔] split, a [⅔, ⅓] split, and a side-by-side split. In FIG. 1, the [½, ½] split 104 is depicted as being selected.

However, to select a format option, the operator may be required to access the menu option 102 prior to scanning and be unable to change the selection during scanning. Alternatively, the operator may be able to access the menu option 102 during scanning (e.g., during the ultrasound examination), in which case the operator is forced to divert their attention away from the clinical information (e.g., ultrasound images) during the scan session. Hence, conventional ultrasound systems may not display ultrasound images and allow their display format in ways that are beneficial to the patient and/or the operator of the ultrasound system.

Accordingly, systems, devices, and techniques are disclosed herein that allow an operator of an ultrasound system to dynamically implement a split screen format during an ultrasound examination without taking their attention away from the clinical display that displays the ultrasound images. Moreover, the operator is not restricted to a few predetermined options for the split screen, but rather can select a ratio between simultaneously displayed images from a continuum of ratios and/or sizes. In some embodiments, the ultrasound system automatically adjusts the display screen format (e.g., the relative sizes of B-mode and M-mode images that are simultaneously displayed) based on an event, such as a type of anatomy being detected in an image, an amount of pressure applied from the ultrasound probe to the patient, a dynamic range of data in an ultrasound image, a number of cycles displayed in an M-mode image or waveform, and the like. In some embodiments, the ultrasound system anchors one ultrasound image as the split screen is adjusted, so that the one ultrasound image remains centered about an anchor point. A user can pan across the one ultrasound image if the split screen causes the image to be cropped. In some embodiments, the ultrasound system takes advantage of touch screen functionality to enable the user to dynamically adjust the split between 2D and scrolling windows as they desire, as described in further detail below.

To illustrate one or more embodiments of the present disclosure, FIGS. 2A-2D illustrate user interfaces of a display screen of an ultrasound system in which two ultrasound images are simultaneously displayed, including a B-mode image and an M-mode image. The B-mode and M-mode ultrasound images in FIGS. 2A-2D are examples of ultrasound images that can be displayed, and embodiments of the disclosure are not limited to these examples. For instance, an ultrasound system in accordance with embodiments of the present disclosure can display any suitable images related to an ultrasound examination, such as a C-mode image, a three-dimensional image (3D image) a medical worksheet, a picture of a patient, an ECG waveform, videos and/or animations, such as part of on-device training and/or telemedicine, etc. Further, embodiments of the present disclosure are not limited to simultaneously displaying two images as illustrated in FIGS. 2A-2D, and can simultaneously display any suitable number of images, such as three images, four images, etc.

Figure 2A:
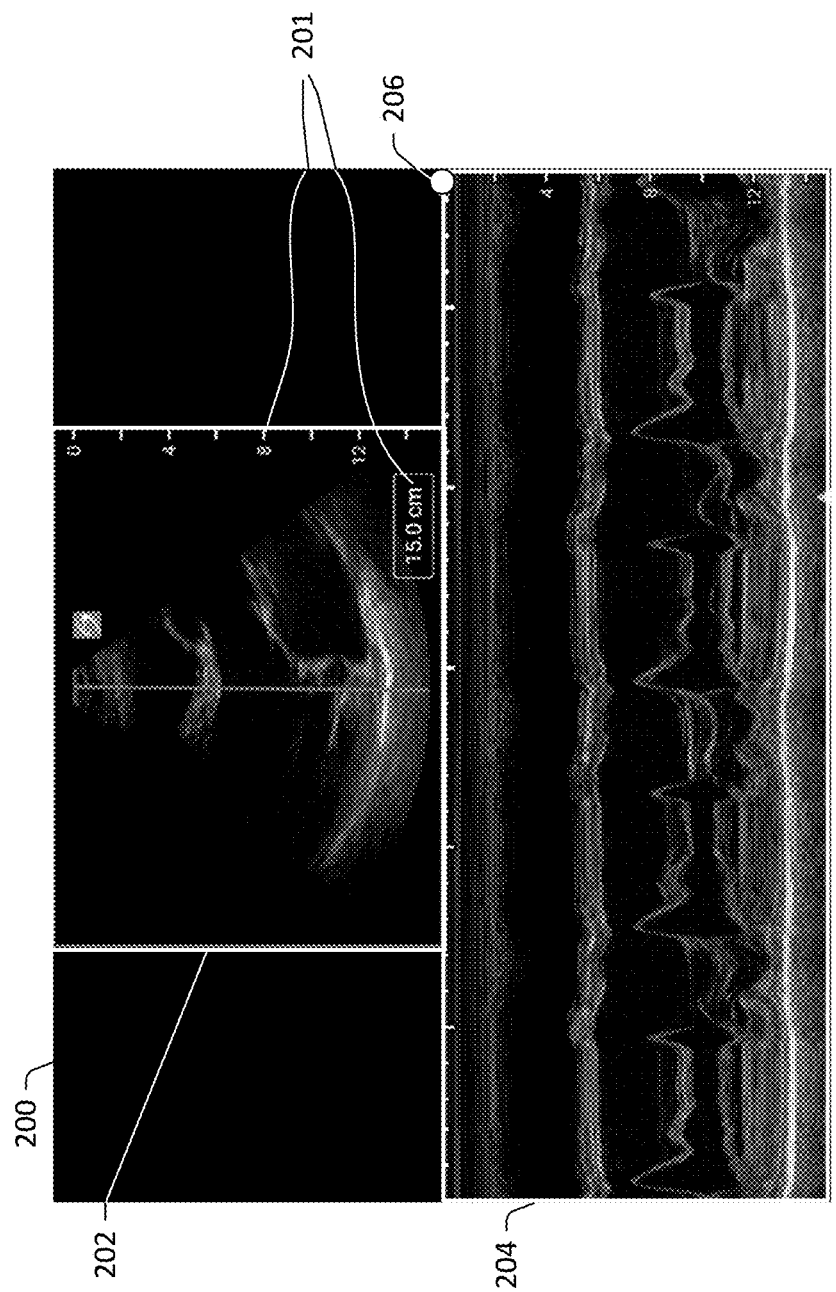
FIG. 2A illustrates a user interface that simultaneously displays two images, according to some embodiments.

FIG. 2A illustrates a user interface 200 (e.g., a display interface of a display device of an ultrasound system) that simultaneously displays two images, including a first image 202 and a second image 204. In some embodiments, first image 202 and second image 204 are ultrasound images. For example, the first image 202 can be a B-mode ultrasound image and the second image 204 can be an M-mode ultrasound image. As shown in FIG. 2A, user interface 200 includes diagnostic information 201 associated with the first ultrasound image 202. In some embodiments, the diagnostic information 201 includes a probe orientation indicator, a depth label indicating, e.g., a maximum examination depth, a scale, hash marks or other diagnostic information. In some embodiments, the diagnostic information 201 includes diagnostic data related to an ultrasound examination that produces the displayed ultrasound image, e.g., probe orientation data, patient biometric data, ultrasound machine settings (e.g., gain, depth, examination presets, etc.), probe pressure data, and other diagnostic data. The user interface 200 can be implemented as a touchscreen and include a handle 206. A handle can be used to drag or move an object. In an example, the handle 206 can be user defined. For instance, the user can place the handle 206 at any suitable location of the user interface. Additionally or alternatively, the handle 206 can be placed by the ultrasound system. For instance, the handle 206 can be placed on a divider (e.g., a horizontal) line between the first ultrasound image 202 and the second ultrasound image 204. The handle 206 can include not only the circle depicted at handle 206, but also a line that runs across the user interface 200 and intersects the handle 206, such as the horizontal line in FIG. 2 that separates the first ultrasound image 202 and the second ultrasound image 204. By selecting the handle 206 and dragging it, the user can adjust the display format of the user interface 200, including the split between the first ultrasound image 202 and the second ultrasound image 204. Generally, a user can drag a handle (e.g., the handle 206) in any direction, including horizontal, vertical, and diagonal. In one example, the handle can be dragged in a direction (e.g., horizontally) to change the display format, such as by changing from the display format depicted in FIG. 2A to a side-by-side display format.

Figure 2B:
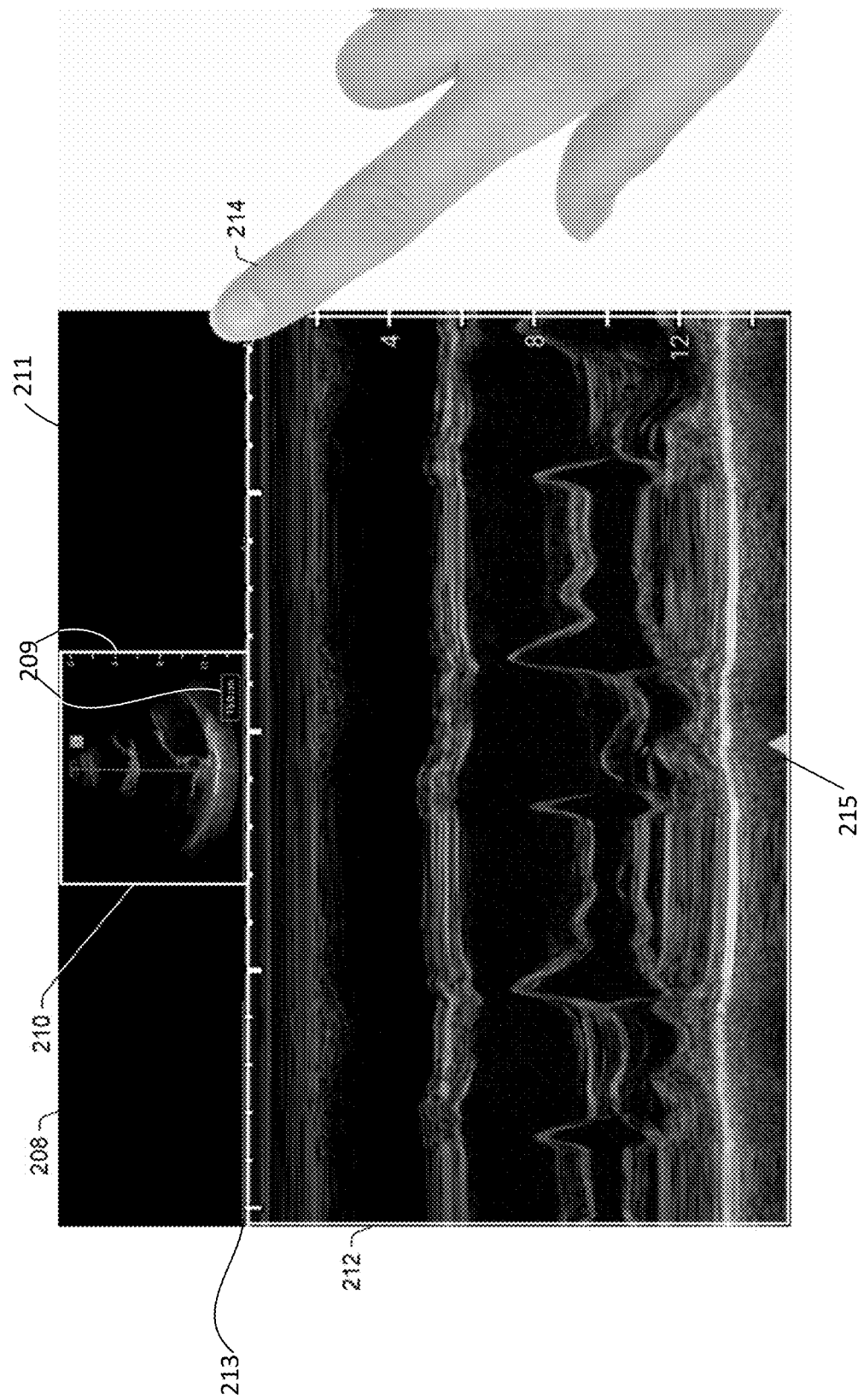
FIG. 2B illustrates adjustment of split screen display of two images according to some embodiments.

FIG. 2B illustrates adjustment of a split screen display of two images according to some embodiments. FIG. 2B shows a user interface 208 in which the handle 206 of FIG. 2A or a divider line 213 between two field of views (FOVs) that include first and second ultrasound images has moved by a user's finger 214 up in a vertical direction. That is, user interface 208 represents the user interface 200 of FIG. 2A upon the finger 214 moving the handle 206. In response to the handle 206 being moved by the finger 214, a first ultrasound image 210 and a second ultrasound image 212 are simultaneously displayed in the user interface 208. Compared to the first ultrasound image 202 of FIG. 2A, the first ultrasound image 210 of FIG. 2B is decreased in size, but still displays the same information, e.g., has not been cropped (or zoomed).

Compared to the second ultrasound image 204 of FIG. 2A, the second ultrasound image 212 of FIG. 2B is increased in size and displays less information in the sense that it has been cropped (or zoomed in). For example, the second ultrasound image 204 of FIG. 2A displays approximately four cycles of a waveform while the second ultrasound image 212 of FIG. 2B displays approximately three cycles of the waveform in a larger display format. For instance, the time scale of the second ultrasound image 204 is greater than the time scale of the second ultrasound image 212. As shown in FIG. 2B, the time scale of the second ultrasound image 212 includes a time marker 215.

In some embodiments, moving the handle 206 or divider line 213 can crop the displayed ultrasound image content and preserve the diagnostic information on the user interface 200. Referring to FIG. 2B, as the first ultrasound image 210 decreases in size when the handle 206 and/or divider line 213 is moved up, the diagnostic information 209 (e.g., depth indicator, orientation indicator, scale, hash marks, and the like) can be placed in an area 211 that is outside of the area of the first ultrasound image 210 to avoid obscuring the image. In some embodiments, as the first ultrasound image 210 decreases when the handle 206 or divider line 213 is moved up, the diagnostics information that is along the vertical Y axis flips along the horizontal X axis to be in the area 211 that is outside of the area of the first ultrasound image 210 while maintaining their position along the Y axis. In some embodiments, as the first ultrasound image 210 decreases in size when the handle 206 or divider line 213 is moved up, a number of hash marks is reduced to avoid obscuring the image segment. In some embodiments, electrosonography (ESG) data are placed in the area 211.

Figure 2C:
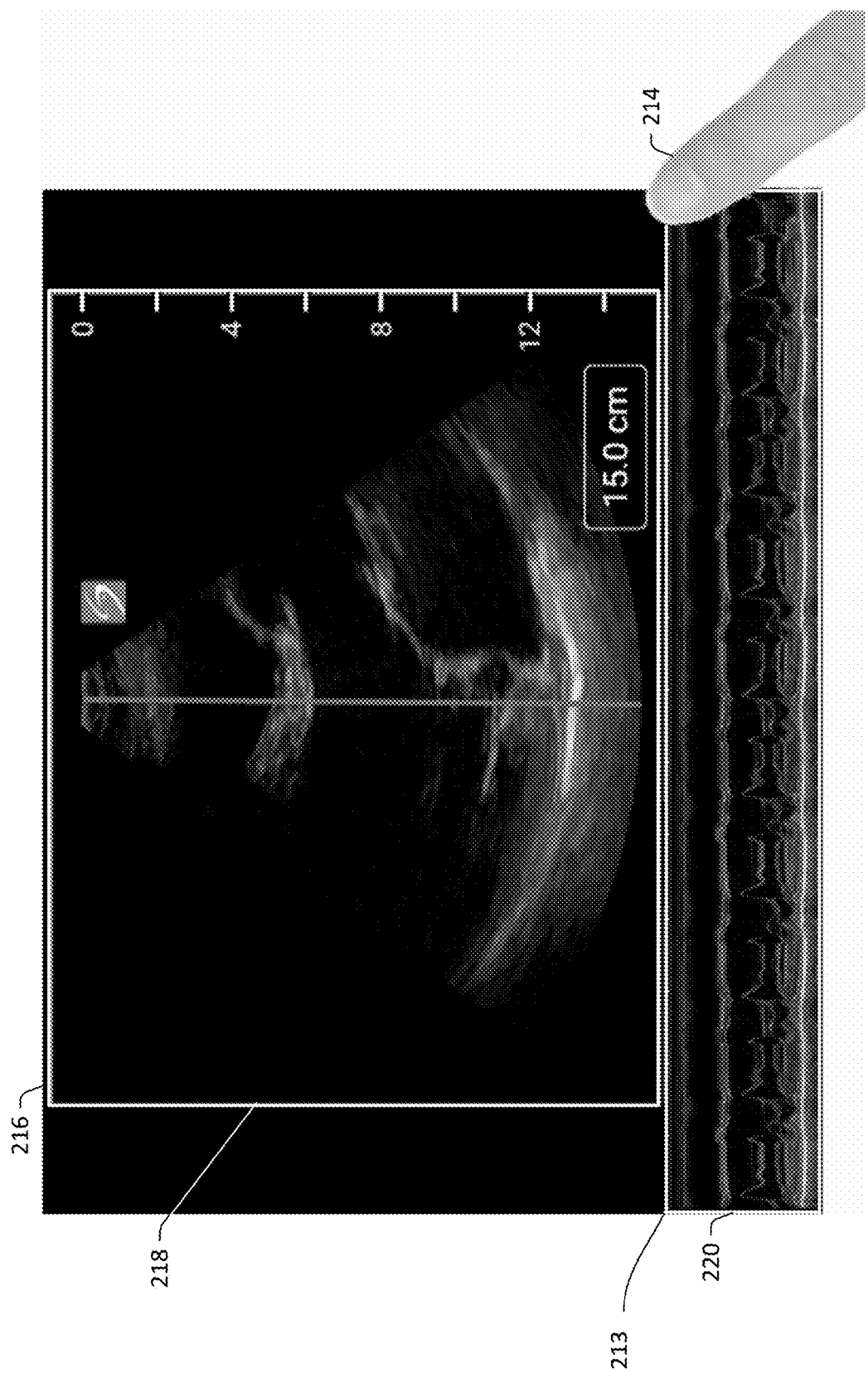
FIG. 2C illustrates adjustment of split screen display of two images according to some embodiments.

FIG. 2C illustrates adjustment of a split screen display of two images according to some embodiments. As the user slide the handle 206 with their finger 214 along the vertical axis (e.g., up and down) the user interface, the ultrasound system can automatically adjust the relative sizes of the first and second ultrasound images, and simultaneously display the resulting images in real time. For example, FIG. 2C shows a user interface 216 in which the user's finger 214 has moved the handle 206 of FIG. 2A down (in a vertical direction). In response to the movement, the user interface 216 displays a first ultrasound image 218 and a second ultrasound image 220.

In response to the handle 206 being moved by the finger 214, a first ultrasound image 218 and a second ultrasound image 220 are simultaneously displayed in the user interface 216 of FIG. 2C. Compared to the first ultrasound image 202 of FIG. 2A, the first ultrasound image 218 of FIG. 2C is increased in size, and still displays the same information, e.g., has not been cropped (or zoomed). Compared to the second ultrasound image 204 of FIG. 2A, the second ultrasound image 220 of FIG. 2C is decreased in size and displays more information in the sense that it has been expanded (or zoomed out). For example, the second ultrasound image 204 of FIG. 2A displays approximately four cycles of a waveform while the second ultrasound image 220 of FIG. 2C displays approximately ten cycles of the waveform in a smaller display format. For example, the time scale is increased in the second ultrasound image 220 of FIG. 2C compared to the time scale of the second ultrasound image 204 of FIG. 2A.

In an example, the ultrasound system imposes at least one of a maximum and minimum image size. For instance, the ultrasound system can restrict the movement of a handle so that one of the images is not reduced below the minimum size, and/or the other of the images is not increased above the maximum size. The minimum and maximum sizes can be user defined, such as by an operator of the ultrasound system via a menu option in a user interface. In an example, the minimum size is set to zero and the maximum size is set to the display size. Hence, in this example, a user can move a handle to a corner of the display, maximizing the display of one of the images, and removing from display the other of the images.

Figure 2D:
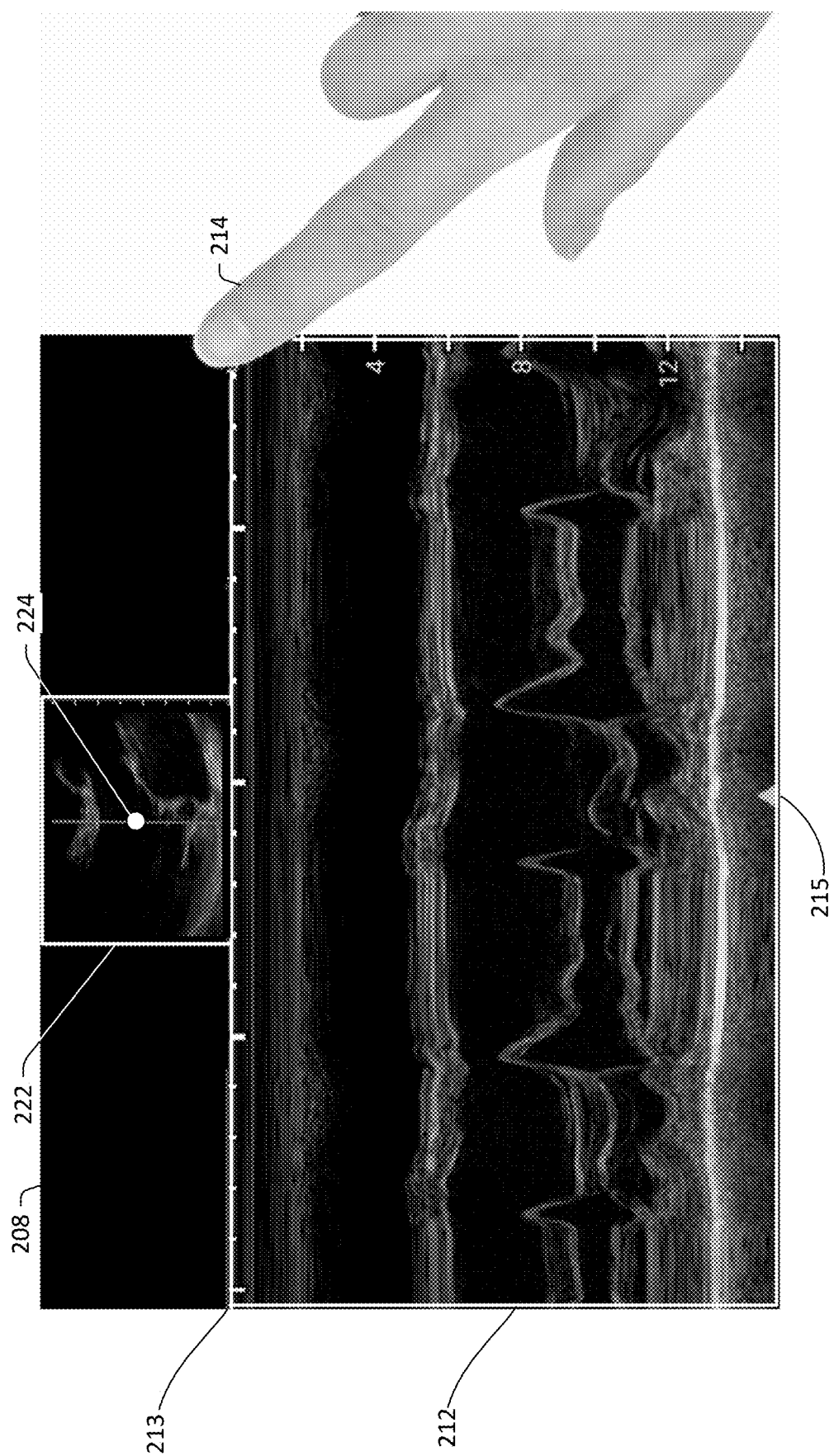
FIG. 2D illustrates adjustment of split screen display of two images according to some embodiments.

FIG. 2D illustrates adjustment of a split screen display of two images according to some embodiments. As described above, the ultrasound system can automatically adjust the relative sizes of the first and second ultrasound images, and simultaneously display the resulting images in real time. Moreover, the ultrasound system can be implemented to adjust a display of one or both the first and second ultrasound images based on an anchor applied to one of the images. For example, FIG. 2D shows an alternative of the user interface 208 of FIG. 2B that is displayed in response to the handle 206 and/or divider line 213 being moved by the finger 214 vertically up and includes a first ultrasound image 222 and the second ultrasound image 212 that are simultaneously displayed. However, compared to the first ultrasound image 210 of FIG. 2B, the first ultrasound image 222 of FIG. 2D has been cropped and centered around an anchor 224. As shown in FIG. 2D, as the handle 206 and/or divider line 213 moves up, the displayed content of the image 222 crops and moves up to maintain the center of the sector of the image 222 at the center of the field of view (FOV) defined by the anchor 224. That is, the anchor 224 has been defined for the first ultrasound image 222 and as the finger 214 moves vertically, the ultrasound system centers the content of the first ultrasound image 222 about the anchor 224, and crops the image around the anchor 224 to fit the allotted size defined by the position of the divider line 213 and/or handle 206. The user may then pan across the first ultrasound image 222, such as by swiping their finger across (or up and down, or both) the first ultrasound image 222, so that the user interface is updated to expose part of the first ultrasound image 222 that was hidden but is brought into view by the swiping/panning gesture. In some embodiments, the second ultrasound image is updated in response to adjusting the first ultrasound image. In some embodiments, the first ultrasound image is updated in response to adjusting the second ultrasound image.

For example, adjusting an M-line in the first ultrasound image 222 can adjust an M-mode scrolling in the second ultrasound image 212. Additionally or alternatively, adjusting a B-line in the first ultrasound image 222 can adjust retracing the sweep on the second ultrasound image 212. In an example, magnifying the first ultrasound image 222, and selecting a point in the first ultrasound image 222 to adjust the M-line to make sure that the M-line is in a proper spot for examination, can simultaneously change the waveforms on the second ultrasound image 212. Adjusting one of the ultrasound images based on adjusting of another one of the ultrasound images can be applied to an M-mode imaging, a Doppler mode imaging, cine imaging or other ultrasound imaging. In some embodiments, only one of the first ultrasound image or the second ultrasound image is updated.

In an embodiment, in a similar fashion, the user can perform a swiping gesture on the second ultrasound image 212 to pan across and expose cycles of the waveform of the M-mode image that are hidden from view in FIG. 2D. In an embodiment, an anchor can be assigned to the second ultrasound image 212, so that the second ultrasound image can be centered around the anchor and cropped as the finger 214 is moved downward along the vertical axis of the user interface. In some embodiments, the first ultrasound image 222 is updated in response to adjusting the second ultrasound image 212. For example, performing a swiping gesture from left to right or from right to left across the second ultrasound image 212 (e.g., going back and forth along a horizontal time scale), the first ultrasound image 222 (e.g., a 2D image) adjusts accordingly (e.g., opens and closes a heart valve to correspond to a time point of the second ultrasound image 212). In other words, the first ultrasound image 222 is adjusted to match a displayed cycle or time point of the second ultrasound image 212. In some embodiments, dragging a handle 206 or a divider line between two FOVs of ultrasound images affects resizing the FOV and does not impact the image resolution.

In some embodiments, dragging a handle 206 and/or a divider line 213 between two FOVs of ultrasound images causes an automatic update and/or reconfiguring of at least one of the ultrasound images. For example, magnifying a first ultrasound image, adjusting a feature in the magnified first ultrasound image and then moving the handle to resize the second ultrasound image causes an automatic update of the second ultrasound image, as described in further detail with respect to FIG. 10.

Figure 11:
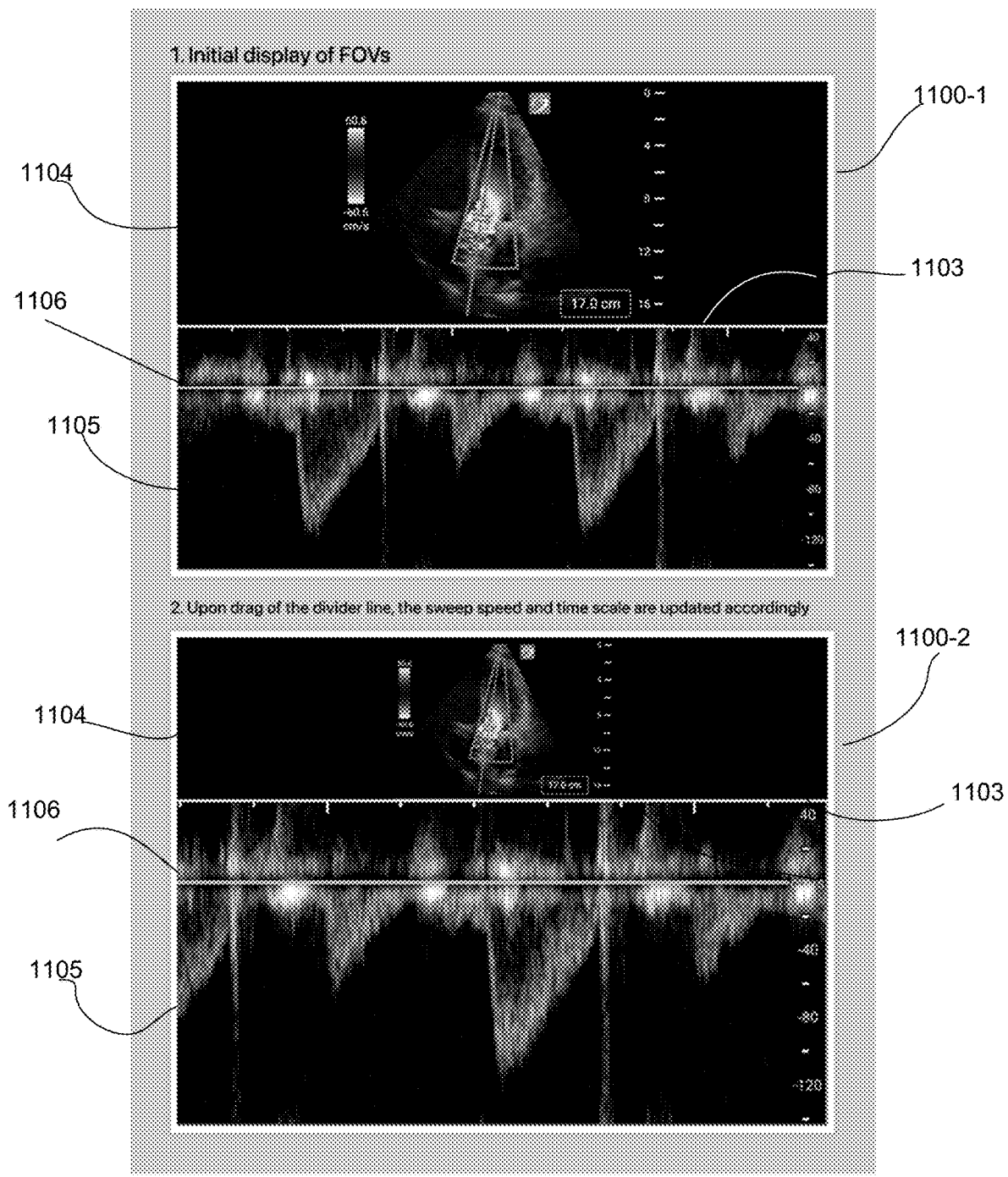
FIG. 11 is a view illustrating two versions of a user interface according to some embodiments.

In some embodiments, moving the horizontal line 213 and/or handle 206 to resize the first ultrasound image can change the time scale displayed along the x-axis for the second ultrasound image, the sweep speed (e.g., sample rate) or both the time scale and the sweep speed for the second ultrasound image, as described in further detail with respect to FIG. 11.

For example, moving the horizontal line 213 down to increase the first ultrasound image 218, can increase the time scale displayed along the x-axis for the second ultrasound image 220 and/or the sweep speed, as shown in FIG. 2C. For example, moving the horizontal line 213 up to decrease the first ultrasound image 222 can reduce the time scale displayed along the x-axis and/or the sweep speed for the second ultrasound image 212. In some embodiments, the image data are stored in a database with enough resolution and size to adjust the time scale. In some embodiments, the image data are stored in a database with a maximum resolution and size to facilitate rescaling, interpolation, and the like. In some embodiments, the rescaling of the image data is performed to facilitate measurements on the data (e.g., calipers) and/or to provide pixel to distance calibration.

In some embodiments, the time scale shown along the x-axis, the sweep speed for the ultrasound image, or both the time scale and the sweep speed are changed using a pinching gesture across the time scale. In some embodiments, the time scale and/or the sweep speed are adjusted based on the amount of data being presented on a display. In some embodiments changing the time scale is indicated by moving the time marker 215, hash marks on the time scale, or both the time marker and the hash marks on the time scale in the ultrasound image.

In an example, an anchor point, such as the anchor 224, can be user defined. For example, an operator of the ultrasound system can select an "insert anchor" menu option (not shown), and then touch a location of an ultrasound image that is displayed to insert an anchor point for the ultrasound image at the location. Additionally or alternatively, the ultrasound system can automatically insert an anchor point on an ultrasound image. For instance, the ultrasound system can include a processor system that implements one or more neural networks that can detect an object (e.g., an anatomy) in an ultrasound image. The processor system can then determine a centroid of the object, based on a segmentation of the object generated by the neural network, and place an anchor point at the centroid location. Hence, the ultrasound system can automatically determine that a B-mode image includes a bladder, calculate a center (e.g., centroid) of the bladder, and center and crop the B-mode image around the center of the bladder when the display format is adjusted, such as by moving the handle 206 as described above. This and other operations are illustrated in FIG. 3.

Figure 3:
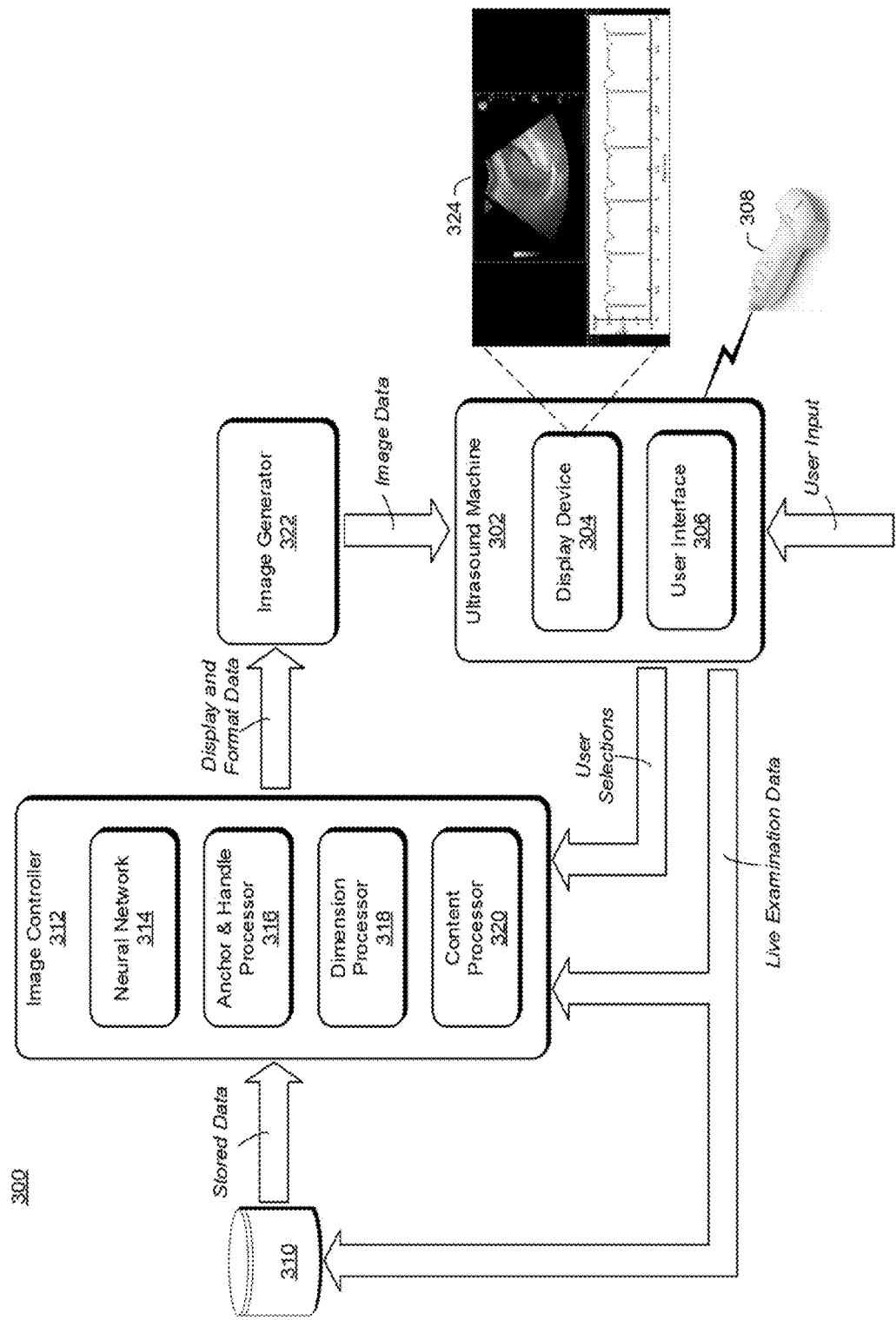
FIG. 3 illustrates an ultrasound system in accordance with some embodiments.

FIG. 3 illustrates an ultrasound system 300 in accordance with some embodiments. The ultrasound system 300 includes an ultrasound machine 302 that includes (or is coupled to) a display device 304. Examples of the display device 304 include a clinical display that is attached to the ultrasound machine 302, e.g., mechanically attached, and display devices that can be coupled in a wired and/or wireless manner to the ultrasound machine, such as a tablet, smartphone, smart glasses, heads-up display, etc. The ultrasound machine 302 also includes a user interface 306 implemented to receive information from a user and convey information to the user. Examples of the user interface 306 include a touchscreen (such as can be implemented as part of the display device 304), a touch pad, a keyboard, a track ball, a display screen, a microphone, a speaker, a gaze reader that can track a user's eye movements to determine what they are looking at, combinations thereof, and the like. Hence, a user can provide any suitable user input to adjust the display format as described above with respect to FIGS. 2A-2D. For instance, a user can input a touch gesture to a touchscreen of the ultrasound system, as described above. Additionally or alternatively, a user's gaze can be tracked. For instance, a user can slide the handle 206 by moving their eye. Additionally or alternatively, a user can speak a voice command to move the handle 206, and the like.

The ultrasound system 300 also includes an ultrasound probe 308, which can also be referred to as a scanner or a transducer. The ultrasound probe 308 can include multiple ultrasound probes, packaged separately or together. The ultrasound probe 308 includes a transducer or array of transducers and is implemented to generate ultrasound signals and receive ultrasound reflections that can be converted into image data. The ultrasound probe 308 can be coupled to the ultrasound machine 302 in a wired and/or wireless manner. In an example, the probe 308 includes an inertial measurement unit (IMU) that can communicate with the ultrasound system so that the location and orientation of the ultrasound probe 308 can be determined in a coordinate system. An IMU can include a combination of accelerometers, gyroscopes, and magnetometers, and generate location and/or orientation data including data representing six degrees of freedom (6DOF), such as yaw, pitch, and roll angles in a coordinate system. Typically, 6DOF refers to the freedom of movement of a body in three-dimensional space. For example, the body is free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis). Additionally or alternatively, the ultrasound system can include a camera to determine location and/or orientation data for the ultrasound probe 308.

In an example, the ultrasound probe 308 includes one or more pressure sensors that can determine an amount of pressure applied from the ultrasound probe 308 and transferred to the patient. For instance, a lens of the probe through which ultrasound is transmitted and received can include one or more pressure sensors that generate sensor data for determining pressure applied to the patient. Additionally or alternatively, the ultrasound probe 308 can include one or more pressure sensors on a surface of the probe, such as where a user grips the probe. The ultrasound system can determine the amount of pressure applied to the patient from the amount of pressure applied to the surface of the probe, such as based on a component of the pressure in an axial direction of the probe (e.g., towards the patient). In an example, the user input to the ultrasound machine 302 includes one or more indications of pressure applied to the ultrasound probe 308. Hence, a user may squeeze, swipe, or pinch on the surface of the ultrasound probe 308 to move a handle and adjust a display format, as described above with respect to FIGS. 2A-2D.

The ultrasound system 300 also includes, or otherwise has access to, a database 310. For example, the database 310 can be maintained by one or more non-transitory storage media (e.g., storage memories). The ultrasound machine 302 provides live examination data to the database 310 and to an image controller 312. The live examination data can include any suitable data related to an ultrasound examination, e.g., gathered during an ultrasound examination, such as ultrasound images, probe orientation data, a photograph of a patient, a medical worksheet with populated data fields, patient biometric data (e.g., ECG data and the like), ultrasound machine settings (e.g., gain, depth, examination presets, etc.), probe pressure data, and the like.

The ultrasound machine 302 also provides user selections to the image controller 312. The user selections can be in any data format and represent user input supplied to the ultrasound machine 302, such as user movements of a handle (e.g., the handle 206), user-assigned anchors, etc. In an example, the ultrasound machine 302 also provides the user selections to the database 310. In embodiments, the database 310 provides stored data to the image controller 312. The stored data can include stored representations of the live examination data and the user selections. Hence, the ultrasound system 300 can be implemented to operate not only in a live setting during an ultrasound examination, but also on stored data after an ultrasound examination has been performed. Hence, a user can simultaneously display multiple ultrasound images on the display device 304 that have been gathered during a previous ultrasound examination, and adjust the split between the ultrasound images, as illustrated above in FIGS. 2A-2D, at a time subsequent to the ultrasound examination. Therefore, the operator can analyze the ultrasound data after the ultrasound examination to see if the operator missed anything or misdiagnosed anything during the examination.

The ultrasound system 300 also includes the image controller 312 that is implemented to generate display and format data to simultaneously display two or more ultrasound images, as illustrated above in FIGS. 2A-2D. For instance, the display and format data can include content to include in images that are to be simultaneously displayed, and the dimensions of the images. To generate the display and format data, the image controller 312 includes one or more neural networks 314, an anchor and handle processor 316, a dimension processor 318, and a content processor 320.

The neural network 314 can include one or more neural networks implemented to generate any suitable inference related to the display and format data. In some embodiments, the neural network 314 detects an object/anatomy in an image, such as a bladder, and generates a segmentation of the object/anatomy. The ultrasound system 300 can use the segmentation to center an ultrasound image as a handle is moved, as described above with respect to FIG. 2D. Additionally or alternatively, the neural network 314 can classify an anatomy, and based on the classification, the ultrasound system 300 can automatically move a handle location to define a screen layout (e.g., split) between two or more simultaneously displayed images. For instance, the neural network 314 can classify an object as a left ventricle of a heart, and in response, set the display format so that a top ¾ of the display screen is allocated for a B-mode image, and a bottom ¼ of the display screen is allocated for displaying data related to the left ventricle, such as an ejection fraction and the like. In an example, the ultrasound system 300 can display as one of the images a portion of a medical worksheet related to the identified object/anatomy. For instance, the bottom ¼ of the display screen can display not just the ejection fraction data for the left ventricle, but questions and answers to the questions of a medical worksheet for fields related to the left ventricle, such as a field for entering a value of the ejection fraction.

The neural network 314 can automatically set a display format (e.g., a split between two simultaneous images) based on any suitable parameter. In one example, the neural network 314 sets the split based on an examination type (e.g., a bladder preset). Additionally or alternatively, the neural network 314 can set the display format based on an imaging parameter, such as a gain or depth setting. Additionally or alternatively, the neural network 314 can set the display format based on anatomy being imaged, e.g., an anatomy determined by the neural network 314.

In an example, the neural network 314 applies a color to the segmentation of the anatomy. The color can be based on the type of anatomy that is segmented and determined by the neural network 314. For instance, the neural network 314 can color a heart anatomy red, a bladder anatomy green, and a lung anatomy blue so that an operator can quickly identify a segmented anatomy.

In some embodiments, the ultrasound system 300 can enable the display format in a split screen mode (as illustrated above with respect to FIGS. 2A-2D) based on an event (e.g., a system event). One example of such an event is that the neural network 314 generates an image quality score for an ultrasound image that is above a threshold image quality. Hence, when the ultrasound system determines that the image quality is "good enough" for a displayed ultrasound image, such as a B-mode image, then the ultrasound system can enable the simultaneous display of that image (e.g., the B-mode image) with another image, such as an M-mode image. Another example of an event includes the determination of a blood vessel as a vein rather than an artery. For instance, the neural network 314 can classify blood vessels as veins or arteries. When the neural network 314 classifies a blood vessel in an ultrasound image (e.g., a B-mode image) as a vein (e.g., a probability of the blood vessel being a vein is greater than a threshold probability), then the ultrasound system can enable the simultaneous display of the ultrasound image with a second ultrasound image. The second ultrasound image can correspond to a different imaging plane than the imaging plane of the first image. Additionally or alternatively, the second ultrasound image can display a representation of an interventional instrument, such as a needle as it is inserted into the vein. One of the images, or yet another image that is simultaneously displayed, can display parameters of the blood vessel, such as an amount of compression of the blood vessel as determined by the neural network 314.

In some embodiments, the ultrasound system includes two or more probes for simultaneous scanning of a patient. For instance, a first operator can use a first probe on a patient and a second operator can use a second probe on a patient. Additionally or alternatively, one probe can be a wearable probe that is patient worn, such as via an armband on a patient. The ultrasound system can automatically switch between display of images generated from the two probes, or a display format that defines a split between the images of the two probes, based on any suitable factor, such as which probe produces images having better quality, which probe is "ON" and scanning, an amount of pressure applied from the probes to the patient, etc. In an embodiment, the ultrasound system displays a 3D image, such as generated from the data of two or more probes, simultaneously with image data corresponding to only one of the probes (e.g., a B-mode image generated from the reflected ultrasound received by one of the probes).

In one example, the neural network 314 identifies an operator of the ultrasound system 300 and based on the identification of the operator and a history of the operator's selections, the neural network 314 can automatically adjust the screen layout (e.g., split) between two or more simultaneously displayed images to suit the operator. In an example, the neural network 314 adjusts the scale of an image that is displayed. For instance, the neural network 314 can determine the number of cycles of a waveform (e.g., in an ECG signal), and adjust the time scale of the display of the waveform so that at least, or at most, a number of cycles of the waveform are displayed. For instance, the neural network 314 can set the time scale so that at least three cycles of the waveform are displayed, and/or no more than ten cycles of the waveform are displayed. Additionally or alternatively, the neural network 314 can adjust the amplitude scale of the waveform, so that the waveform is not clipped when it is displayed. Hence, the neural network 314 can predict the amplitude scale of a waveform based on previous cycles of the waveform, a gain setting on an ultrasound machine, or combinations thereof, and adjust the amplitude scale so that future cycles of the waveform are not likely to be clipped.

In an example, the neural network 314 can enable the simultaneous display of two ultrasound images based on the pressure of the probe applied to a patient. For instance, when the pressure applied to the patient is above a threshold amount of pressure (e.g., two psi), the neural network 314 can configure the ultrasound system 300 to display two or more images, such as a B-mode image and an M-mode image.

The image controller 312 also includes the anchor and handle processor 316 that can generate and process anchor and handle data for ultrasound images, such as the anchor 224 and the handle 206 previously described. In an example, the anchor and handle processor 316 manages anchor locations, including to generate an anchor for an image. For instance, the neural network 314 can generate a segmentation of an anatomy and provide the segmentation to the anchor and handle processor 316, which can calculate a centroid (e.g., a center of mass) of the segmentation. The anchor and handle processor 316 can then assign an anchor point to the location of the centroid in the image. The anchor and handle processor 316 can also assign anchor locations to images based on user input, such as according to a user-assigned location. In one example, the anchor and handle processor 316 assigns an anchor location by default to a center of an ultrasound image. The default anchor location can be overwritten if the neural network 314 segments an anatomy, or if a user assigns an anchor location.

In some embodiments, the anchor and handle processor 316 also manages handle locations for images (e.g., ultrasound images). The anchor and handle processor 316 can generate handle locations, such as when a user assigns a handle to a display of ultrasound images. For instance, a user can assign a handle location to any point on a display that separates two or more images. In an example, the user can designate the handle to move horizontally, vertically (like the handle 206 described above), or a combination thereof (e.g., a diagonal movement). Hence, the user can move the handle to cause a side-by-side, over-and-under, or diagonal display of the ultrasound images.

In some embodiments, the anchor and handle processor 316 assigns a handle location to a line that separates (or partitions) a display screen into two or more image regions. The line can be horizontal, vertical, or diagonal. The anchor and handle processor 316 can assign the line as a handle by default, and this default handle can be overwritten by the anchor and handle processor 316 if a user assigns a handle location, or if the ultrasound system 300 automatically assigns a handle location. For example, a user can speak "set up a side-by-side display" or the like, and the ultrasound system 300 can automatically display an image on the left side of the display and another image on the right side of the display and define a handle as the vertical line separating the two images.

The image controller 312 also includes the dimension processor 318 that is implemented to determine the dimensions of images that are to be displayed. For example, based on the display format (e.g., the locations of one or more handles that define disjoint display regions, the size of the display, etc.), the dimension processor 318 determines the sizes of images for display. The sizes/dimensions can be in any format, such as a number of pixels, percentage of display size, etc., with coordinate locations. The image controller 312 also includes the content processor 320 that is implemented to determine the content of images that are to be displayed. For example, based on whether a user selects, or the ultrasound system automatically designates a crop or zoom function, the content processor 320 can determine whether an image is to be cropped or simply resized (e.g., zoomed) when a handle is moved to adjust the display format (e.g., screen split), as previously described with respect to FIGS. 2A-2D. Based on this determination, the content processor 320 can determine the image content that is to be displayed by the ultrasound images. In an example, when a user pans a cropped image that is displayed, the content processor 320 determines the content of the image for display responsive to the pan instruction, including image content not exposed prior to the panning.

The image controller 312 generates the display and format data based on any suitable data processed by, or generated by, the neural network 314, the anchor and handle processor 316, the dimension processor 318, and the content processor 320. Additionally or alternatively, the image controller 312 can generate the display and format data based on the live examination data provided by the ultrasound machine 302 and/or the stored data supplied by the database 310. For instance, the image controller 312 can adjust the split screen of the display based on one or more of the live examination data, the stored data, and any data processed or generated by the image controller 312. The display and format data can include image content, image dimensions, and coordinates for the images that are to be simultaneously displayed. The image controller 312 provides the display and format data to the image generator 322, which can include any suitable processing system to generate image data (e.g., images) based on the display and format data. The image generator 322 generates the image data and provides it to the display device 304. The images 324 show two simultaneously displayed images, including an ultrasound image and an ECG image, displayed by the ultrasound system 300 in accordance with embodiments of the present disclosure.

The database 310, the image controller 312, and the image generator 322 are illustrated for clarity in FIG. 3 as separate processing blocks. However, these processing blocks can be implemented in any suitable integrated or discrete manner. In one example, one or more of the database 310, the image controller 312, and the image generator 322 are included in at least one of the ultrasound machine 302 and the probe 308.

As previously described, the ultrasound system can simultaneously display any suitable images related to an ultrasound examination, including ultrasound images, biometric data, medical worksheet data, patient photographs (e.g., a photograph of a medical condition, such as a lesion or abscess), and the like. In an example, the ultrasound system is implemented to display data for twins in utero. For example, one or more ultrasound probes can be used to generate ultrasound images of the twins, and one or more ECG devices can be used to determine heart rates (e.g., ECG signals) for the twins. The ultrasound system can simultaneously display any combination of the ultrasound images and the ECG signals. In some embodiments, the ultrasound system can automatically switch from displaying data for a first twin to displaying data for the second twin based on an event, such as determining that the image quality for the second twin is better than the image quality for the first twin, the heart rate signal being stronger (e.g., better detection) for the second twin than the first twin, etc. For instance, the ultrasound system can switch from the simultaneous display of the first twin's ultrasound image and ECG signal to the simultaneous display of the second twin's ultrasound image and ECG signal. Alternatively, the ultrasound system can emphasize the data for the second twin over the first twin, such as by enlarging the ultrasound image of the second twin and reducing the size of the ultrasound image of the first twin.

Figure 4:
FIG. 4 illustrates a method performed by an ultrasound system in accordance with some embodiments.

FIG. 4 illustrates a method 400 performed by an ultrasound system in accordance with some embodiments. Operations of the method are performed by processing logic that can comprise hardware (circuitry, dedicated logic, etc.), software (such as is run on a general-purpose computer system or a dedicated machine), firmware, or combinations thereof.

A display device is configured to simultaneously display an ultrasound image and an additional image (block 402). A processor system is configured to cause the display device to change the simultaneous display so that one of the ultrasound image and the additional image increases in size by an amount and the other of the ultrasound image and the additional image decreases in size by an additional amount that is based on the amount (block 404), as described above.

The ultrasound system can include a memory implemented to store the ultrasound image and the additional image during an ultrasound examination. Subsequent to the ultrasound examination, the memory can transfer the ultrasound image and the additional image to the display device for the simultaneous display and the change to the simultaneous display of block 404. Hence, the ultrasound system can operate on stored data after an ultrasound examination and is not limited to real-time operation during the ultrasound examination.

In some embodiments, the processor system is implemented to configure the ultrasound system in a first imaging mode to acquire the ultrasound image and in a second imaging mode to acquire the additional image. For example, the first imaging mode can include a B-mode imaging configuration, and the second imaging mode can include an M-mode imaging configuration. Additionally or alternatively, the ultrasound system can include a camera, and the second imaging mode can include a photographic imaging mode using the camera, and the additional image can include a photograph of the patient taken with the camera. In some embodiments, the additional image includes at least one of a patient photograph, an electrocardiogram waveform (see images 324 of FIG. 3), an additional ultrasound image, and a medical worksheet. In some embodiments, the additional image includes an artificial intelligence (AI) overlay (e.g., segmentation). In some embodiments, the additional image is an MRI image. In some embodiments, the ultrasound system is configured in a learn mode and the ultrasound image is a reference image (i.e., an example image of what to capture) and the additional image is a live ultrasound image. In some embodiments, the ultrasound system is configured to operate in a color compare mode to compare the ultrasound image and the additional image. In some embodiments, the ultrasound system is configured to operate in a review mode to compare the ultrasound image and the additional image. In some embodiments, the ultrasound system is configured to compare two different examinations and the ultrasound image is from a previous examination and the additional image is from a current examination. In some embodiments, the ultrasound system includes one or more neural networks configured to generate a comparison result of the ultrasound image and the additional image to track size of anatomy features, e.g., lesion/growth/cyst, compare ejection fraction (EF) over time on past and current images.

Figure 7:
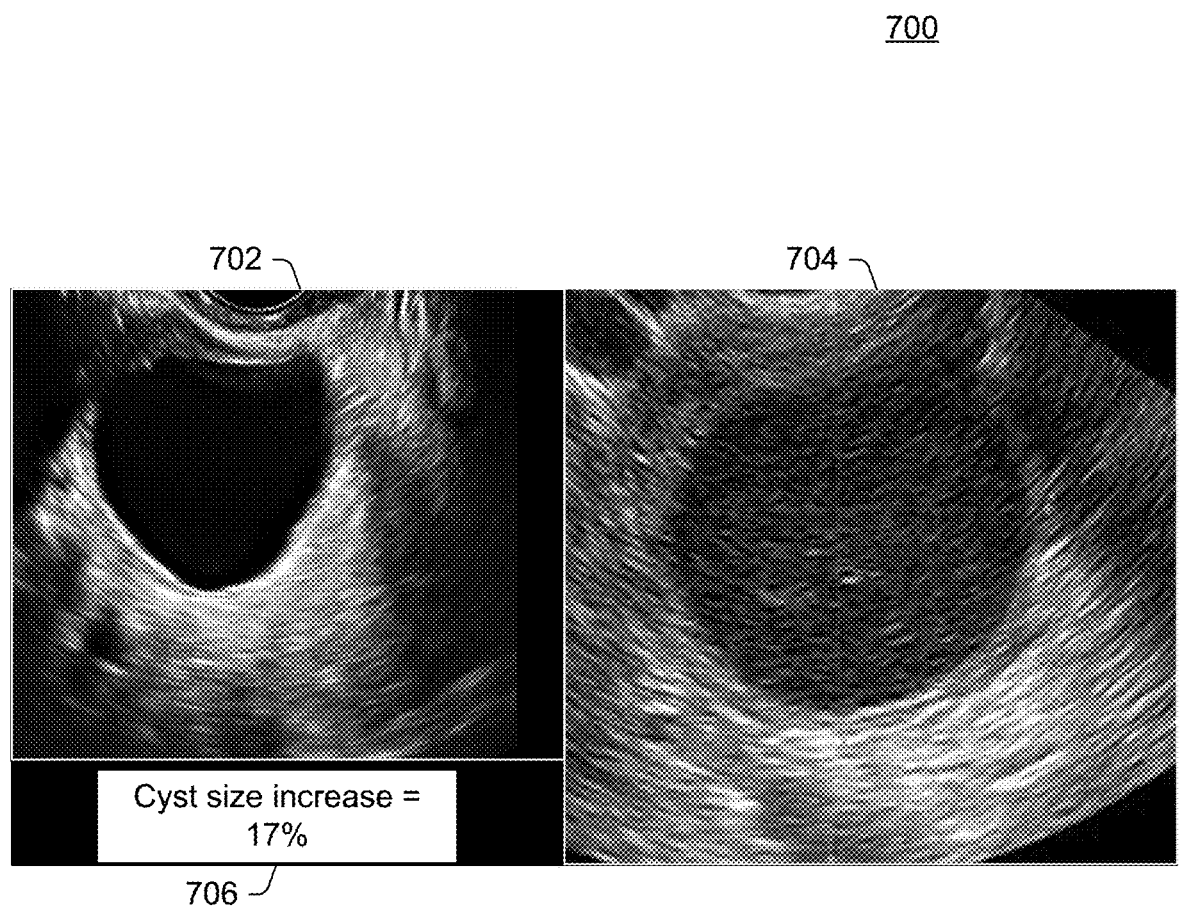
FIG. 7 is a view illustrating a user interface with a first image of a cyst from a previous ultrasound examination that is simultaneously displayed in a side-by-side display format with a second image of the cyst from a current ultrasound examination according to some embodiments.

For example, FIG. 7 is a view 700 illustrating a user interface with a first image 702 of a cyst from a previous ultrasound examination that is simultaneously displayed in a side-by-side display format with a second image 704 of the cyst from a current ultrasound examination according to some embodiments. As a result of the smaller display size of the first image 702 compared to the second image 704, the user interface also includes a space 706 that is absent image content. The ultrasound system displays the relative size increase in text format in the space 706 as "Cyst size increase=17%" to indicate that the cyst has increased in size by 17% from the previous ultrasound examination to the current ultrasound examination. The ultrasound system can determine this size increase using one or more neural networks that can segment the anatomy (e.g., the cyst) and generate area and/or volume measurements.

Figure 8:
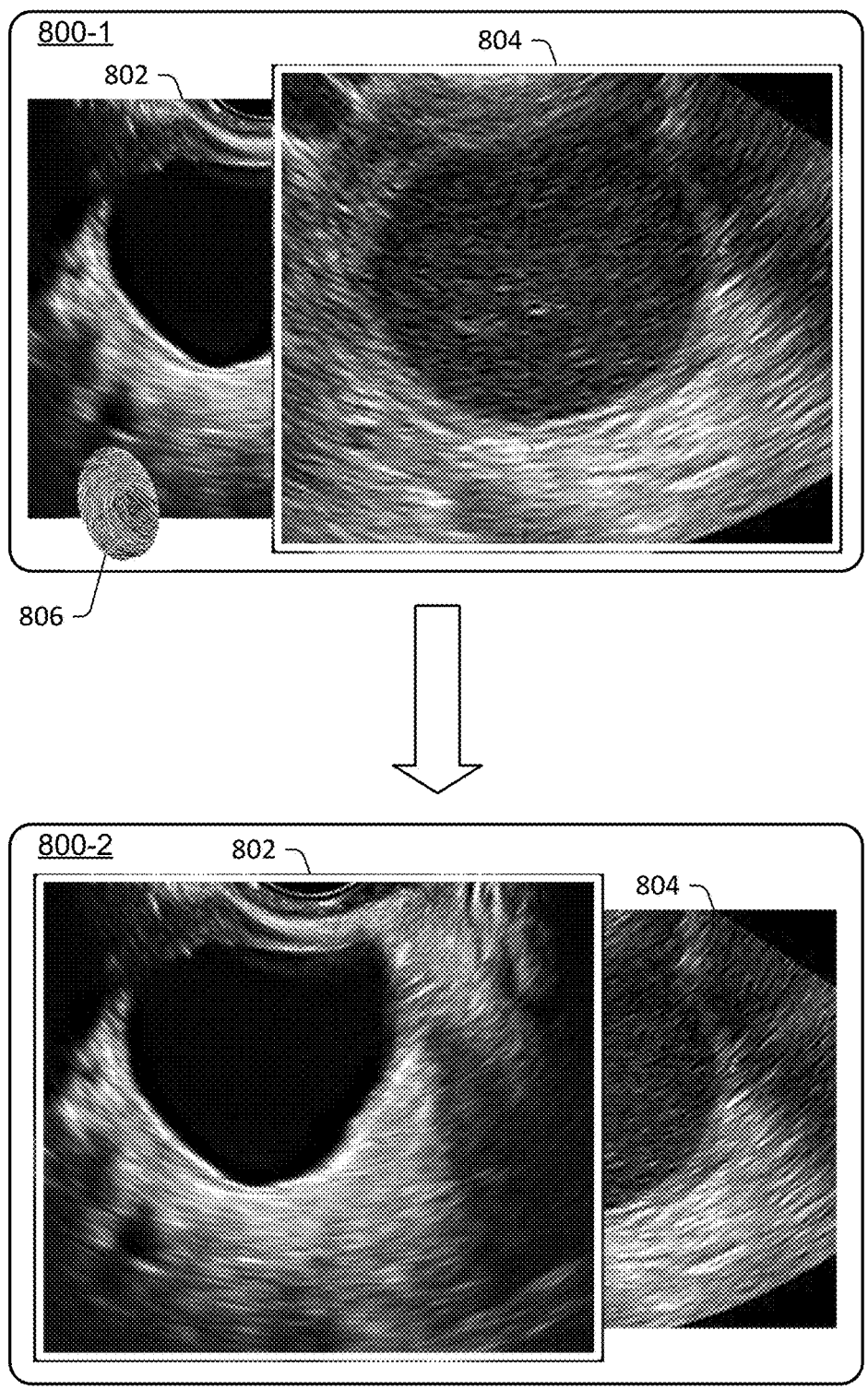
FIG. 8 is a view illustrating two versions of a user interface and according to some embodiments.

In some embodiment, one of the ultrasound and additional images is partially obscured by the other one of the ultrasound and additional images on the display device. In some embodiments, the partially obscured image is moved out of the other of the ultrasound and additional images on the display device in response to tapping at the partially obscured image. FIG. 8 is a view 800 illustrating two versions a user interface 800-1 and 800-2 according to some embodiments. The user interface 800-1 includes an ultrasound image 802 from a previous ultrasound and an ultrasound image 804 from a current ultrasound examination. In this version of the user interface, the ultrasound image 804 from the current ultrasound examination partly obscures the ultrasound image 802 from the previous ultrasound examination and is itself unobscured. A user taps on the ultrasound image 802, indicated by the thumbprint 806. Responsive to the tapping, the version of the user interface 800-2 is displayed.

The user interface 800-2 also depicts the ultrasound image 802 from the previous ultrasound examination and the ultrasound image 9804 from the current ultrasound examination. However, in the user interface 800-2, the ultrasound image 802 from the previous ultrasound examination now partly obscures the ultrasound image 804 from the current ultrasound examination and is itself unobscured. In an example, responsive to the tapping, the unobscured ultrasound image (e.g., the ultrasound image 804) can be enlarged relative to the size of the partly obscured ultrasound image (e.g., the ultrasound image 802).

Figure 9:
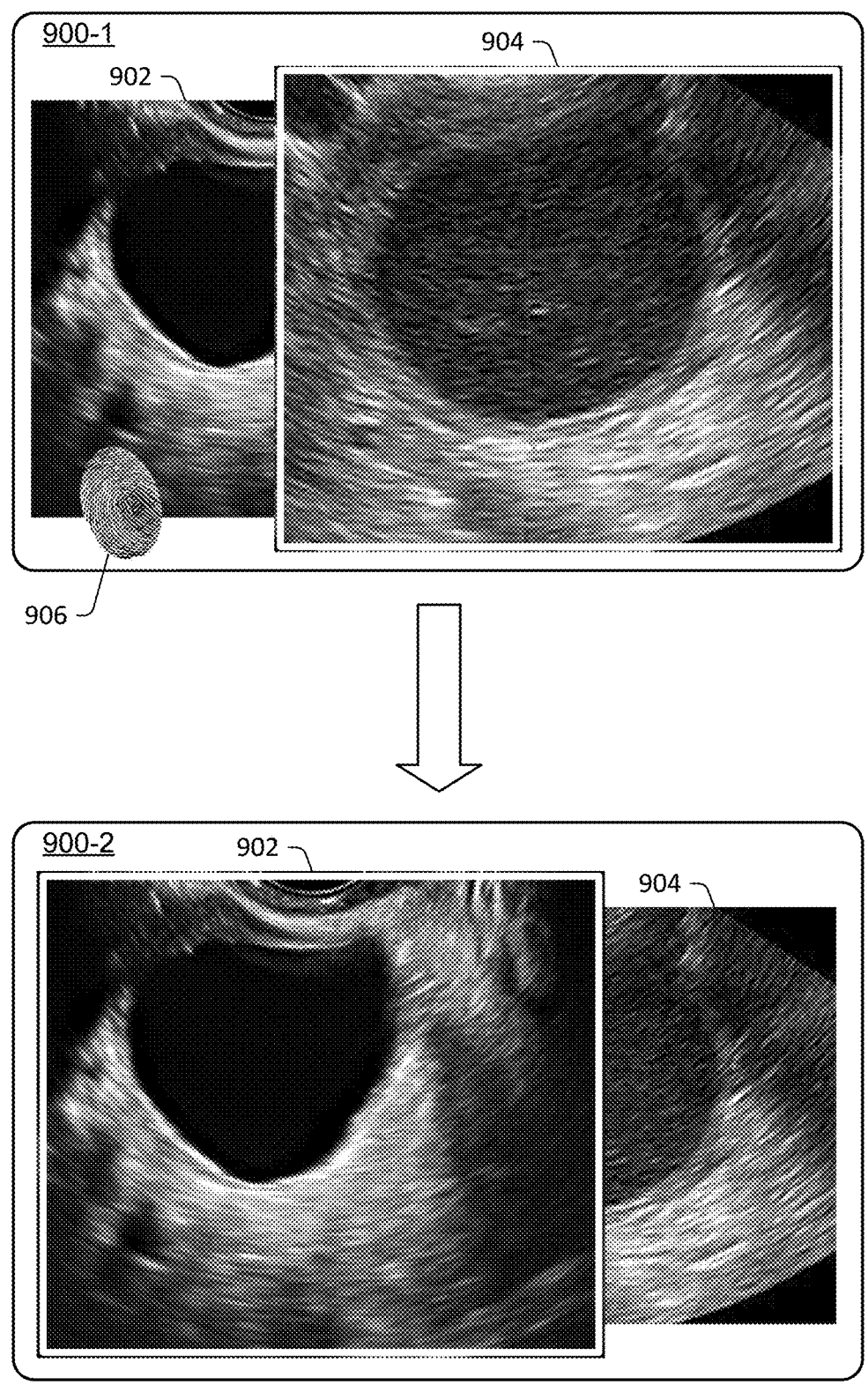
FIG. 9 is a view illustrating two versions of a user interface according to some embodiments.

FIG. 9 is a view 900 illustrating two versions of a user interface 900-1 and 900-2 according to some embodiments. In the example illustrated in FIG. 9, responsive to the tapping indicated by a thumbprint 906 in the user interface 900-1, the ultrasound images are positioned within the user interface 900-2 so that neither of the ultrasound images 902 and 904 obscure the other of the ultrasound images, such as by arranging the images in a side-by-side display format with no overlap between the images.

Returning to FIG. 4, in some embodiments, the change to the simultaneous display of block 404 causes at least one of the ultrasound image and the additional image to include a different amount of image content compared to the simultaneous display of block 402. For instance, one of the images can be cropped for the change to the simultaneous display. In an example, the change to the simultaneous display includes to adjust a time scale of the additional image, e.g., a number of cycles of a waveform that are displayed. In some embodiments, the ultrasound image depicts a first imaging plane and the additional image includes an additional ultrasound image that depicts a second imaging plane. One of the imaging planes can depict an interventional instrument, such as a needle.

In some embodiments, the ultrasound system includes a user input device implemented to receive a pan command (e.g., a pan gesture, such as a touch gesture, voice command, eye movement, combinations thereof, and the like). The display device can, responsive to the pan command, expose image content of at least one of the ultrasound image and the additional image, the image content being hidden prior to receiving the pan command. For instance, a user can pan across an image to expose content that was hidden prior to the pan. The pan can be horizontal, vertical, or diagonal relative to the display screen.

In some embodiments, the user input device is implemented to receive a user command including at least one of a touch gesture, a voice gesture, and an eye movement gesture. The processor system can cause the display device to change the simultaneous display as described at block 404 responsive to the user command.

In some embodiments, the processor system determines an occurrence of a system event. Examples of system events include the setting of an examination type, the detection of an anatomy in the ultrasound image, the detection of an operator identification, an amount of probe pressure applied to a patient (e.g., above a threshold amount of pressure), a probe in an orientation and/or location, such as normal to a patient and proximate their skin, combinations thereof, and the like. The processor system can cause the display device to change the simultaneous display as described at block 404 responsive to the determination of the occurrence of the system event.

In some embodiments, prior to the simultaneous display, the display device is implemented to display the ultrasound image and not the additional image. For instance, the split screen mode can be disabled. The processor system can determine an occurrence of a system event, such as the detection of an anatomy in the ultrasound image, the measurement of the anatomy (e.g., with calipers), the satisfaction of an image quality threshold for the ultrasound image, and the setting of an imaging parameter. The processor system can cause the display device to enable the simultaneous display (e.g., the split screen mode) responsive to the determination of the occurrence of the system event.

In some embodiments, the processor system determines an anchor location for the ultrasound image. For example, a user can set an anchor location or the ultrasound system can automatically set the anchor location. The change to the simultaneous display at block 404 can include to center image content of the ultrasound image about the anchor location. In an example, the processor system implements a neural network to generate a segmentation of an anatomy in the ultrasound image. The processor system can determine the anchor location based on the segmentation, such as by assigning the anchor location to the centroid of the segmentation, on a boundary/edge of the segmentation, etc.

FIG. 5 illustrates a method 500 performed by an ultrasound system in accordance with some embodiments. An ultrasound system can include a display device, a processing system, and at least one computer-readable medium storing instructions executable via the processing system to implement an ultrasound application. Operations of the method are performed by processing logic that can comprise hardware (circuitry, dedicated logic, etc.), software (such as is run on a general-purpose computer system or a dedicated machine), firmware, or combinations thereof.

The ultrasound application causes the display device to implement a split screen display that includes two display regions that are disjoint, the split screen display including a handle location (block 502). The ultrasound application receives a user input to move the handle location (block 504). The ultrasound application adjusts, responsive to the user input, sizes of the display regions while keeping the display regions disjoint (block 506).

In some embodiments, the ultrasound system is implemented to perform an ultrasound examination. The ultrasound application can cause the display device to implement the split screen display, receive the user input, and adjust the sizes of the display regions during the ultrasound examination. At least one of the display regions can display an ultrasound image of the ultrasound examination.

In some embodiments, the handle location is implemented for continuous movement along an edge of the split screen display, such as a vertical edge, a horizontal edge, an edge of one of the regions, etc. The ultrasound application can continuously resize the two display regions responsive to the continuous movement of the handle location. The display regions can have a union that occupies an area of the split screen display, and the adjustment of the sizes of the display regions maintains that the union occupies the area. For instance, the size of the union is not changed as the display regions are resized. As an example, as one display region is increased in size, the other of the display regions decreases in size to maintain the size of the union.

In some embodiments, the ultrasound system includes a neural network that generates, based on an ultrasound image that is displayed in one of the display regions, an inference. Examples of an inference include a classification of an object, such as classifying a blood vessel as a vein or artery, identification of an anatomy, such as identifying a heart or bladder, generating a segmentation of an anatomy, and generating a probability. The ultrasound application can generate, based on the inference, the sizes of the display regions.

Additionally or alternatively, the ultrasound system can include a biological sensor implemented to generate biological sensor data. The ultrasound application can determine, based on the inference, image content that is based on the biological sensor data for display in the other of the display regions. For instance, the inference can identify an anatomy as a heart, and the other of the display regions can display a hear rate signal, e.g., ECG waveform.

In some embodiments, the ultrasound system includes two ultrasound probes. One of the display regions can display an ultrasound image based on ultrasound received from one of the ultrasound probes and the other of the display regions can display an additional ultrasound image based on additional ultrasound received from the other of the ultrasound probes.

FIG. 6 illustrates a method 600 performed by an ultrasound system in accordance with some embodiments. An ultrasound system can include a display device, a processing system, and at least one computer-readable medium storing instructions executable via the processing system to implement an ultrasound application. Operations of the method are performed by processing logic that can comprise hardware (circuitry, dedicated logic, etc.), software (such as is run on a general-purpose computer system or a dedicated machine), firmware, or combinations thereof.

The ultrasound application causes the display device to implement, during an ultrasound examination, a split screen display that includes two or more display regions (block 602). One of the display regions is implemented to display a B-mode ultrasound image and another of the display regions is implemented to display an M-mode ultrasound image. The ultrasound application adjusts, during the ultrasound examination, sizes of the display regions and image content of at least one of the B-mode ultrasound image and the M-mode ultrasound image (block 604). For example, at least one of the B-mode ultrasound image and the M-mode ultrasound image can be cropped.

Figure 10:
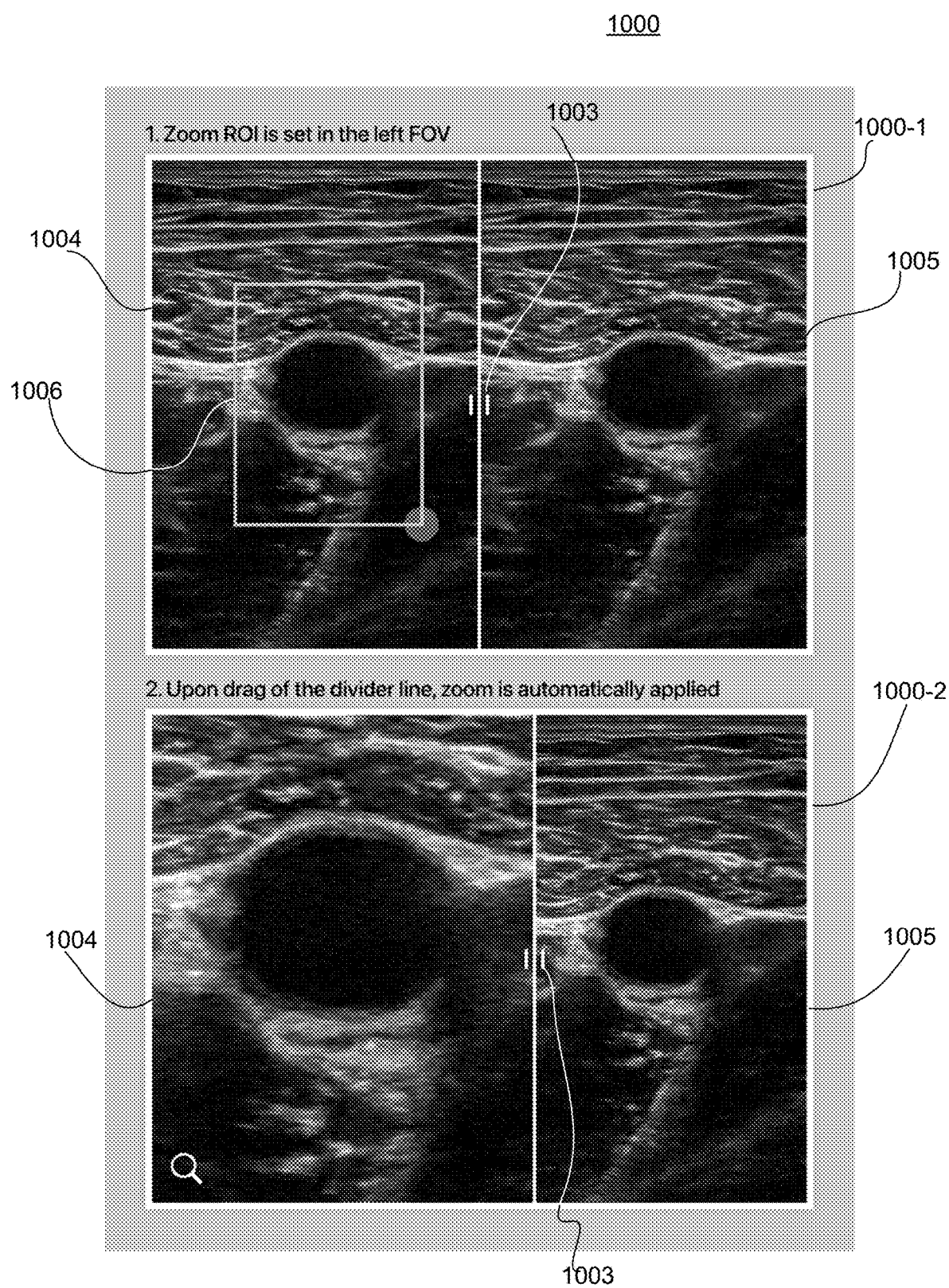
FIG. 10 is a view illustrating two versions of a user interface according to some embodiments.

FIG. 10 is a view 1000 illustrating two versions 1000-1 and 1000-2 of a user interface according to some embodiments. A version 1000-1 of the user interface includes an FOV of the ultrasound image 1004 and an FOV of the ultrasound image 1005. A region of interest (ROI) 1006 to magnify a feature is set in the FOV the ultrasound image 1004. A version 1000-2 illustrates the user interface after dragging a divider line and/or a handle 1003. As shown in version 1000-2 of the user interface, upon dragging the divider line and/or handle 1003, magnification (zoom) is automatically applied to the feature in the FOV of the ultrasound image 1004. As shown in FIG. 10, moving the divider line and/or handle 1003 causes an automatic update of the FOV of the ultrasound image 1005.

FIG. 11 is a view 1100 illustrating two versions 1100-1 and 1100-2 of a user interface according to some embodiments. An initial version 1100-1 of the user interface includes an FOV of the ultrasound image 1104 for a B-mode and an FOV of the ultrasound image 1105 for an M-mode before dragging a divider line and/or handle (not shown) between image 1104 and image 1105. The image 1105 includes a time scale 1103 and a sweep speed scale 1106. A version 1000-2 illustrates the user interface after dragging the divider line and/or handle (not shown) between images 1104 and 1105. As shown in version 1000-2 of the user interface, upon dragging the divider line and/or handle to decrease image 1104, time scale 1103 and sweep speed scale 1106 are updated accordingly. Embodiments of the present disclosure constitute numerous advantages over conventional ultrasound systems. The ultrasound system of embodiments of the present disclosure gives the user direct touch control of the scrolling frame, and does not force the user to select a predetermined display format (e.g., split screen arrangement). The user can keep their focus and interaction on the clinical image while adjusting the display format. The user can quickly and dynamically increase a displayed time window to see more events. The user has the ability to quickly and dynamically increase the size of an image, make their adjustments, and return to a larger window view.

Figure 12:
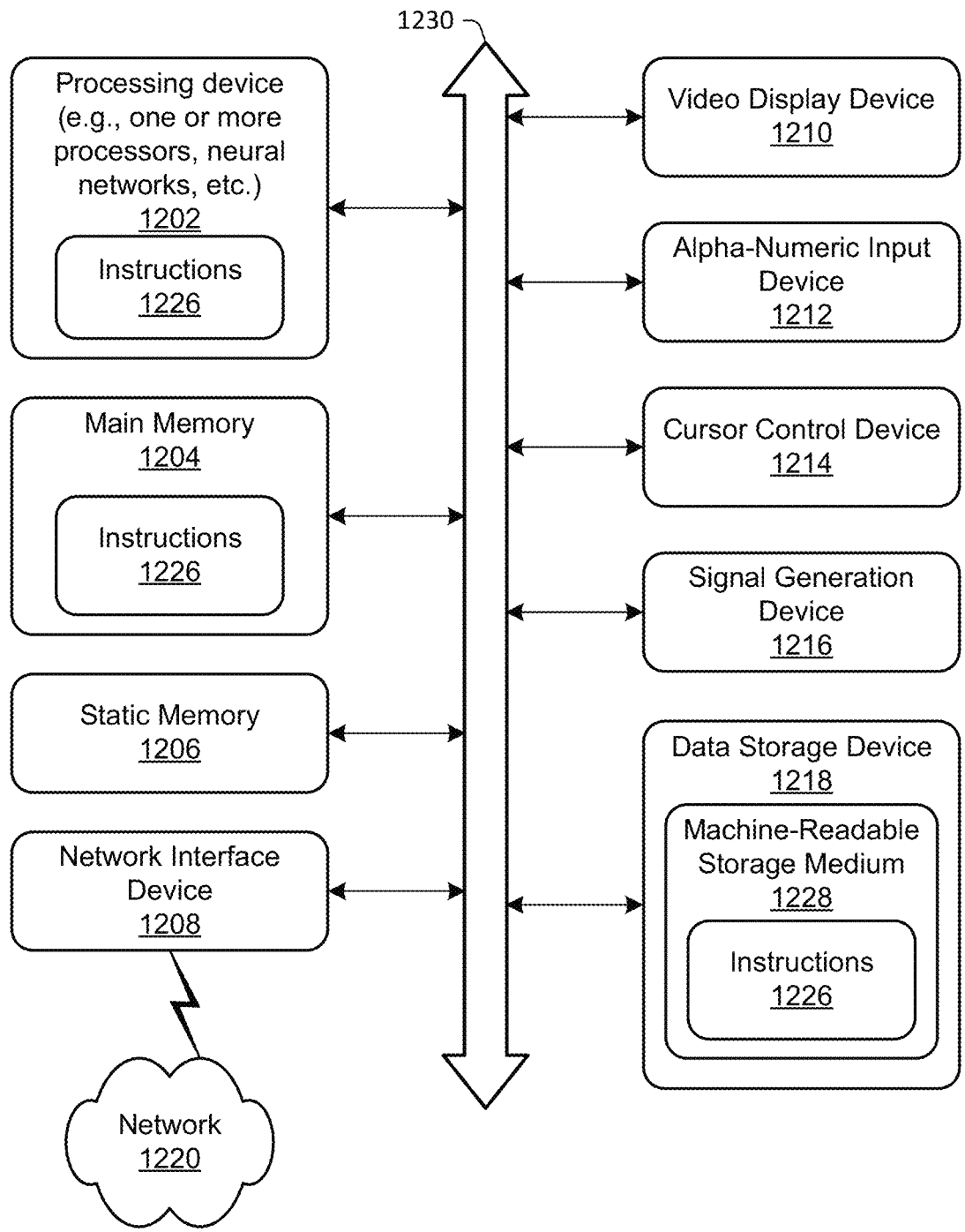
FIG. 12 illustrates a block diagram of an example computing device that can perform one or more of the operations described herein, in accordance with some embodiments.

FIG. 12 is a block diagram of an example computing device 1200 that can perform one or more of the operations described herein, in accordance with some embodiments. Computing device 1200 can be connected to other computing devices in a LAN, an intranet, an extranet, and/or the Internet. The computing device can operate in the capacity of a server machine in client-server network environment or in the capacity of a client in a peer-to-peer network environment. The computing device can be provided by a personal computer (PC), a server computing, a desktop computer, a laptop computer, a tablet computer, a smartphone, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods and processes discussed herein. In some embodiments, the computing device 1200 can be one or more of an access point and a packet forwarding component.

The example computing device 1200 can include a processing device (e.g., a general-purpose processor, a PLD, etc.) 1202, a main memory 1204 (e.g., synchronous dynamic random-access memory (DRAM), read-only memory (ROM)), a static memory 1206 (e.g., flash memory and a data storage device 1218), which may communicate with each other via a bus 1230. Processing device 1202 may be provided by one or more general-purpose processing devices such as a microprocessor, central processing unit, or the like. In an illustrative example, processing device 1202 can comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1202 can also comprise one or more special-purpose processing devices such as an application specific integrated circuit (ASIC), a field programmable gate array (FPGA), a digital signal processor (DSP), network processor, or the like. The processing device 1202 can be configured to execute the operations described herein, in accordance with one or more aspects of the present disclosure, for performing the operations and steps discussed herein.

Computing device 1200 may further include a network interface device 1208 which may communicate with a network 1220. The computing device 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and an acoustic signal generation device 1216 (e.g., a speaker, and/or a microphone). In one embodiment, video display unit 1210, alphanumeric input device 1212, and cursor control device 1214 may be combined into a single component or device (e.g., an LCD touch screen).

Data storage device 1218 may include a computer-readable storage medium 1228 on which may be stored one or more sets of instructions 1226, e.g., instructions for carrying out the operations described herein, in accordance with one or more aspects of the present disclosure. For instance, the instructions 1226 can implement the ultrasound application, as described herein. Instructions 1226 may also reside, completely or at least partially, within main memory 1204 and/or within processing device 1202 during execution thereof by computing device 1200, main memory 1204 and processing device 1202 also constituting computer-readable media. The instructions may further be transmitted or received over a network 1220 via network interface device 1208.

While computer-readable storage medium 1228 is shown in an illustrative example to be a single medium, the term "computer-readable storage medium" should be taken to include a single medium or multiple media (e.g., a centralized or distributed database and/or associated caches and servers) that store the one or more sets of instructions. In some embodiments, the computer-readable storage medium 1228 implements the database of user-defined mappings, as described above. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "transmitting," "determining," "receiving," "generating," "or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium, such as a storage memory.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Reference in the specification to "one embodiment", "an embodiment", "one example", or "an example" means that a particular feature, structure, or characteristic described in conjunction with the embodiment can be included in at least one embodiment. The appearances of the phrases "in one embodiment" or "in an embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

In the specification, the term "and/or" describes three relationships between objects that may exist. For example, A and/or B may represent the following cases: only A exists, both A and B exist, and only B exist, where A and B may be singular or plural.

The foregoing description, for the purpose of explanation, has been described with reference to specific embodiments. However, the illustrative discussions above are not intended to be exhaustive or to limit embodiments of the disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and are not to be limited to the details given herein, but may be modified within the scope and equivalents of the appended claims.

What is claimed is:

1. An ultrasound system comprising:
    a probe for transmitting and receiving ultrasound signals;
    a display device configured to simultaneously display a B-mode ultrasound image and an M-mode ultrasound image that are generated from the ultrasound signals received by the probe in a first user interface; and
    a processor system configured to cause, in response to a user input, the display device to change the simultaneous display in the first user interface to a second user interface to simultaneously display the B-mode ultrasound image and the M-mode ultrasound image, so that the B-mode ultrasound image increases in height by a first amount and the M-mode ultrasound image decreases in height by a second amount that is based on the first amount in the second user interface, wherein the M-mode ultrasound image is zoomed out to display a longer period of time in the second user interface than in the first user interface to provide dynamic scrolling on the display device of the ultrasound system.

2. The ultrasound system as described in claim 1, further comprising a memory implemented to:
    store the B-mode ultrasound image and the M-mode ultrasound image during an ultrasound examination; and
    subsequent to the ultrasound examination, transfer the B-mode ultrasound image and the M-mode ultrasound image to the display device for the simultaneous display and the change to the simultaneous display.

3. The ultrasound system as described in claim 1, wherein the processor system is implemented to configure the ultrasound system in a first imaging mode to acquire the B-mode ultrasound image and in a second imaging mode to acquire the M-mode ultrasound image.

4. The ultrasound system as described in claim 1, wherein at least one of the B-mode ultrasound image and the M-mode ultrasound image in the first user interface includes a first image content amount and the second user interface includes a second image content amount that is different from the first image content amount.

5. The ultrasound system as described in claim 1, wherein the M-mode ultrasound image includes at least one of a patient photograph, an electrocardiogram waveform, an additional ultrasound image, and a medical worksheet.

6. The ultrasound system as described in claim 1, further comprising a user input device implemented to receive a pan command, wherein the display device is implemented to, responsive to the pan command, expose image content of at least one of the B-mode ultrasound image and the M-mode ultrasound image, the image content being hidden prior to receiving the pan command.

7. The ultrasound system as described in claim 1, further comprising a user input device implemented to receive a user command including at least one of a touch gesture, a voice gesture, and an eye movement gesture.

8. The ultrasound system as described in claim 1, wherein the processor system is implemented to determine an occurrence of a system event including at least one of a setting of an examination type, a detection of an anatomy in the B-mode ultrasound image, a detection of an operator identification, and an amount of probe pressure applied to a patient, wherein the processor system is implemented to cause the display device to change the simultaneous display responsive to the determination of the occurrence of the system event.

9. The ultrasound system as described in claim 1, wherein prior to the simultaneous display, the display device is implemented to display the B-mode ultrasound image and not the M-mode ultrasound image, wherein the processor system is implemented to determine an occurrence of a system event including at least one of a detection of an anatomy in the B-mode ultrasound image, a measurement of the anatomy, a satisfaction of an image quality threshold for the B-mode ultrasound image, and a setting of an imaging parameter, wherein the processor system is implemented to cause the display device to enable the simultaneous display responsive to the determination of the occurrence of the system event.

10. The ultrasound system as described in claim 1, wherein the processor system is implemented to determine an anchor location for the B-mode ultrasound image, and the change to the simultaneous display includes to center image content of the B-mode ultrasound image about the anchor location.

11. The ultrasound system as described in claim 10, wherein the processor system is implemented to generate a segmentation of an anatomy in the B-mode ultrasound image and determine the anchor location based on the segmentation.

12. An ultrasound system comprising:
a display device;
a probe for transmitting and receiving ultrasound signals;
a processing system; and
at least one computer-readable medium storing instructions executable via the processing system to implement an ultrasound application configured to:
cause the display device to implement a split screen display in a first user interface that includes two display regions including a first display region to display a B-mode ultrasound image and a second display region to display additional an M-mode ultrasound image that are disjoint, the split screen display including a handle location, the B-mode and M-mode ultrasound images being generated from the ultrasound signals received by the probe;
receive a user input to move the handle location; and
adjust, responsive to the user input, sizes of the display regions while keeping the display regions disjoint to change from the first user interface to a second user interface, wherein the size of the B-mode ultrasound image in the first display region in the second user interface is greater than in the first user interface, and a height of the M-mode ultrasound image in the second display region in the second user interface is smaller than in the first user interface and the M-mode ultrasound image in the second user interface is zoomed out to display a longer period of time than in the first user interface.

13. The ultrasound system as described in claim 12, wherein the ultrasound system is implemented to perform an ultrasound examination, wherein the ultrasound application is configured to implement the cause, the receive, and the adjust during the ultrasound examination, and at least one of the display regions is implemented to display an ultrasound image of the ultrasound examination.

14. The ultrasound system as described in claim 12, wherein the handle location is implemented for continuous movement along an edge of the split screen display and the ultrasound application is implemented for continuous resizing of the two display regions responsive to the continuous movement.

15. The ultrasound system as described in claim 12, further comprising a neural network implemented to generate, based on an ultrasound image that is displayed in one of the display regions, an inference, wherein the ultrasound application is implemented to generate, based on the inference, the sizes of the display regions.

16. The ultrasound system as described in claim 15, further comprising a biological sensor implemented to generate biological sensor data, wherein the ultrasound application is implemented to determine, based on the inference, image content that is based on the biological sensor data for display on the display device.

17. An ultrasound system comprising:
a display device;
a processing system; and
at least one computer-readable medium storing instructions executable via the processing system to implement an ultrasound application configured to:
cause the display device to implement, during an ultrasound examination, a split screen display in a first user interface that includes two or more display regions including a first display region implemented to display a B-mode ultrasound image and a second display region implemented to display an M-mode ultrasound image; and
adjust, during the ultrasound examination and responsive to a user input, sizes of the display regions and image content of at least one of the B-mode ultrasound image and the M-mode ultrasound image to change from the first user interface to a second user interface, wherein the size of the B-mode ultrasound image in the first display region in the second user interface is greater than in the first user interface, and a height of the M-mode ultrasound image in the second display region in the second user interface is smaller than in the first user interface and the M-mode ultrasound image in the second user interface is zoomed out to display a longer period of time than in the first user interface to provide dynamic scrolling in the B-mode ultrasound image and the M-mode ultrasound image on the display device of the ultrasound system.

\* \* \* \* \*